(12) United States Patent
Suzuki et al.

(10) Patent No.: US 10,476,284 B2
(45) Date of Patent: Nov. 12, 2019

(54) BATTERY SYSTEM FOR A POWER TOOL, AS WELL AS BATTERY HOLDER THEREFOR, CHARGER, AND CHARGING SYSTEM

(71) Applicant: MAKITA CORPORATION, Anjo-shi (JP)

(72) Inventors: Hitoshi Suzuki, Anjo (JP); Kosuke Ito, Anjo (JP); Akira Naito, Anjo (JP)

(73) Assignee: MAKITA CORPORATION, Anjo-Shi (JP)

( * ) Notice: Subject to any disclaimer, the term of this patent is extended or adjusted under 35 U.S.C. 154(b) by 0 days.

(21) Appl. No.: 15/340,689

(22) Filed: Nov. 1, 2016

(65) Prior Publication Data

US 2017/0070067 A1  Mar. 9, 2017

Related U.S. Application Data

(63) Continuation of application No. 14/369,710, filed as application No. PCT/JP2012/008289 on Dec. 25, 2012, now Pat. No. 9,537,336.

(Continued)

(51) Int. Cl.
*H02J 7/00* (2006.01)
*H02J 50/40* (2016.01)
(Continued)

(52) U.S. Cl.
CPC .............. *H02J 7/0044* (2013.01); *H02J 5/00* (2013.01); *H02J 7/0021* (2013.01);
(Continued)

(58) Field of Classification Search
CPC ....... Y02E 60/12; H02J 7/0004; H02J 7/0006; H01M 10/48; H01M 10/4257
(Continued)

(56) References Cited

U.S. PATENT DOCUMENTS

| 4,288,733 A | 9/1981 | Bilanceri et al. |
| 4,835,409 A | 5/1989 | Bhagwat et al. |

(Continued)

FOREIGN PATENT DOCUMENTS

| EP | 2141770 A1 | 1/2010 |
| EP | 2166614 A1 | 3/2010 |

(Continued)

OTHER PUBLICATIONS

Office Action from the United States Patent Office dated Feb. 28, 2017 in U.S. Appl. No. 14/633,376, including examined claims 1-2, 4-5.

(Continued)

*Primary Examiner* — Arun C Williams
(74) *Attorney, Agent, or Firm* — J-Tek Law PLLC; Jeffrey D. Tekanic; Scott T. Wakeman

(57) ABSTRACT

A battery system for a power tool includes two or more battery packs (12), at least one battery holder (14) adapted to detachably engage two or more of the battery packs and a charger (16, 216, 316, 416) adapted to detachably engage the battery holder and to simultaneously electrically communicate with two or more of the battery packs while the at least one battery holder engages both the charger and the battery packs.

21 Claims, 25 Drawing Sheets

Related U.S. Application Data

(60) Provisional application No. 61/581,943, filed on Dec. 30, 2011, provisional application No. 61/702,559, filed on Sep. 18, 2012.

(51) Int. Cl.
*H02J 50/10* (2016.01)
*H02J 50/80* (2016.01)
*H02J 5/00* (2016.01)
*H02J 7/02* (2016.01)

(52) U.S. Cl.
CPC .......... *H02J 7/0027* (2013.01); *H02J 7/0045* (2013.01); *H02J 7/02* (2013.01); *H02J 7/025* (2013.01); *H02J 50/10* (2016.02); *H02J 50/40* (2016.02); *H02J 50/80* (2016.02); *H02J 5/005* (2013.01); *H02J 2007/0001* (2013.01); *H02J 2007/0096* (2013.01)

(58) Field of Classification Search
USPC ........................................................ 320/106
See application file for complete search history.

(56) References Cited

U.S. PATENT DOCUMENTS

| | | |
|---|---|---|
| 5,603,095 A | 2/1997 | Uola |
| 5,625,608 A | 4/1997 | Grewe et al. |
| D396,859 S | 8/1998 | Isonaga |
| 5,898,398 A | 4/1999 | Kumai |
| 5,905,438 A | 5/1999 | Weiss et al. |
| 5,909,183 A | 6/1999 | Borgstahl et al. |
| 5,991,637 A | 11/1999 | Gawins et al. |
| D418,836 S | 1/2000 | Matt et al. |
| 6,028,764 A | 2/2000 | Richardson et al. |
| D423,451 S | 4/2000 | Heckenast et al. |
| 6,078,825 A | 6/2000 | Hahn et al. |
| 6,236,326 B1 | 5/2001 | Murphy |
| 6,255,800 B1 | 7/2001 | Bork |
| 6,308,059 B1 | 10/2001 | Domes |
| 6,366,792 B1 | 4/2002 | Katsuki |
| 6,427,070 B1 | 7/2002 | Smith |
| 6,456,837 B1 | 9/2002 | Domes |
| D464,619 S | 10/2002 | Krieger et al. |
| D464,620 S | 10/2002 | Krieger et al. |
| D464,935 S | 10/2002 | Krieger et al. |
| 6,496,688 B2 | 12/2002 | Smith |
| 6,571,949 B2 | 6/2003 | Burrus et al. |
| 6,597,152 B1 | 7/2003 | Jacobs et al. |
| 6,697,617 B2 | 2/2004 | Liebenow |
| 6,778,824 B2 | 8/2004 | Wonak et al. |
| 6,788,925 B2 | 9/2004 | Domes |
| 6,864,798 B2 | 3/2005 | Janik |
| 6,871,060 B1 | 3/2005 | Strohmeier |
| 6,876,873 B2 | 4/2005 | Suzuki |
| 6,977,481 B2 | 12/2005 | Smith |
| 6,982,541 B2 | 1/2006 | Zick et al. |
| 7,003,598 B2 | 2/2006 | Kavanagh |
| 7,010,329 B2 | 3/2006 | Livet et al. |
| 7,027,843 B2 | 4/2006 | Cromer et al. |
| D520,445 S | 5/2006 | Wambeke et al. |
| 7,043,283 B2 | 5/2006 | Domes |
| 7,133,703 B2 | 11/2006 | Aoshima et al. |
| D533,161 S | 12/2006 | Concari et al. |
| 7,170,035 B2 | 1/2007 | Peterson et al. |
| 7,187,947 B1 | 3/2007 | White et al. |
| 7,190,954 B2 | 3/2007 | Wonak et al. |
| 7,194,259 B2 | 3/2007 | DeLine |
| 7,251,505 B2 | 7/2007 | Shin et al. |
| 7,277,726 B2 | 10/2007 | Ahya et al. |
| D554,583 S | 11/2007 | Solland |
| 7,332,889 B2 | 2/2008 | Glasgow et al. |
| 7,356,334 B2 | 4/2008 | Yamashita |
| 7,376,846 B2 | 5/2008 | Hawkins et al. |
| 7,388,350 B1 * | 6/2008 | Wright ................... G08C 17/02 320/107 |
| D578,551 S | 10/2008 | Bonzer |
| 7,466,974 B2 | 12/2008 | Smith |
| 7,471,063 B2 | 12/2008 | Zick et al. |
| D585,822 S | 2/2009 | Hsu |
| 7,557,537 B2 | 7/2009 | Zick et al. |
| 7,602,148 B2 | 10/2009 | Deprun |
| 7,605,742 B2 | 10/2009 | Chuang et al. |
| 7,609,025 B2 * | 10/2009 | Griffin ................... H02J 7/0027 310/50 |
| 7,609,027 B2 | 10/2009 | Zick et al. |
| 7,634,296 B2 | 12/2009 | Haeusel |
| 7,650,145 B2 | 1/2010 | Ukita et al. |
| D609,632 S | 2/2010 | Daniels et al. |
| D609,634 S | 2/2010 | Daniels et al. |
| D609,635 S | 2/2010 | Daniels et al. |
| 7,672,695 B1 | 3/2010 | Rainnie et al. |
| 7,675,746 B2 | 3/2010 | Crooijmans et al. |
| 7,680,490 B2 | 3/2010 | Bloebaum et al. |
| 7,685,341 B2 | 3/2010 | Steinberg et al. |
| 7,715,884 B2 | 5/2010 | Book et al. |
| 7,741,809 B2 | 6/2010 | Zick et al. |
| 7,808,205 B2 | 10/2010 | Rao et al. |
| 7,821,465 B2 | 10/2010 | Rozan |
| 7,825,626 B2 | 11/2010 | Kozisek |
| 7,835,534 B2 | 11/2010 | Cole et al. |
| 7,852,271 B2 | 12/2010 | Grunig et al. |
| 7,862,194 B2 | 1/2011 | Seade |
| 7,868,590 B2 | 1/2011 | Zick et al. |
| 7,907,060 B2 | 3/2011 | Reams |
| 7,915,855 B2 | 3/2011 | Yoon et al. |
| D636,332 S | 4/2011 | Hsu |
| 7,929,998 B1 | 4/2011 | Edwards |
| 7,930,369 B2 | 4/2011 | Marriott et al. |
| 7,937,107 B2 | 5/2011 | Rofougaran et al. |
| 7,941,220 B2 | 5/2011 | Tobacman |
| 7,995,971 B2 | 8/2011 | Rofougaran et al. |
| 8,005,436 B2 | 8/2011 | Rofougaran et al. |
| 8,010,728 B1 | 8/2011 | Grady et al. |
| 8,032,175 B2 | 10/2011 | Rofougaran et al. |
| 8,032,189 B2 | 10/2011 | Guthrie et al. |
| 8,068,336 B2 | 11/2011 | Crooijmans et al. |
| D649,931 S | 12/2011 | James |
| 8,072,341 B2 | 12/2011 | Sheng |
| 8,080,975 B2 | 12/2011 | Bessa et al. |
| D653,203 S | 1/2012 | DuMelle et al. |
| 8,090,890 B2 | 1/2012 | Rofougaran |
| D653,612 S | 2/2012 | DuMelle et al. |
| 8,112,032 B2 | 2/2012 | Ko et al. |
| 8,135,443 B2 | 3/2012 | Aleksic et al. |
| 8,140,129 B2 | 3/2012 | Suzuki et al. |
| 8,149,799 B2 | 4/2012 | Rofougaran |
| 8,155,367 B2 | 4/2012 | Singh |
| 8,155,592 B2 | 4/2012 | Basine |
| 8,155,636 B2 | 4/2012 | Cheng |
| 8,169,188 B2 | 5/2012 | Kogan et al. |
| 8,175,543 B2 | 5/2012 | Rofougaran et al. |
| 8,177,182 B1 | 5/2012 | Wood et al. |
| 8,188,711 B2 * | 5/2012 | Kondo ................... H02J 7/0045 320/107 |
| 8,199,958 B2 | 6/2012 | Weir et al. |
| 8,200,292 B2 | 6/2012 | Wu et al. |
| 8,203,307 B2 | 6/2012 | Zick et al. |
| 8,219,071 B2 | 7/2012 | Kokubo |
| 8,238,894 B2 | 8/2012 | Louch et al. |
| 8,249,650 B2 | 8/2012 | Rofougaran et al. |
| 8,265,617 B2 | 9/2012 | Lazaridis et al. |
| 8,330,665 B2 | 12/2012 | Kaikkonen et al. |
| D674,371 S | 1/2013 | Cho et al. |
| 8,344,959 B2 | 1/2013 | Autti et al. |
| 8,355,965 B2 | 1/2013 | Yamada |
| 8,390,246 B2 | 3/2013 | Taguchi et al. |
| 8,414,347 B2 | 4/2013 | Achan et al. |
| 8,415,923 B2 | 4/2013 | Forsythe |
| 8,449,451 B2 | 5/2013 | Dawe |
| 8,476,866 B2 | 7/2013 | Miwa et al. |
| 8,531,337 B2 | 9/2013 | Castany et al. |
| RE44,557 E | 10/2013 | Domes |

(56) References Cited

U.S. PATENT DOCUMENTS

| | | | |
|---|---|---|---|
| D691,983 S | 10/2013 | Vaughan et al. |
| 8,571,611 B2 | 10/2013 | Solomon |
| 8,666,524 B2 | 3/2014 | Ben-Yaacov et al. |
| D702,181 S | 4/2014 | Maki |
| D706,710 S | 6/2014 | Inskeep |
| 8,847,549 B2 | 9/2014 | Graham |
| 8,872,474 B2 | 10/2014 | Scheucher |
| 8,963,496 B2 | 2/2015 | Yang |
| D723,506 S | 3/2015 | Aglassinger |
| D726,142 S | 4/2015 | Itoh et al. |
| 2002/0023265 A1 | 2/2002 | Metcalf |
| 2003/0053378 A1 | 3/2003 | Lovin et al. |
| 2003/0090239 A1 | 5/2003 | Sakakibara |
| 2003/0192061 A1 | 10/2003 | Hwangbo et al. |
| 2004/0204168 A1 | 10/2004 | Laurila |
| 2004/0225796 A1 | 11/2004 | Hanson et al. |
| 2004/0242286 A1 | 12/2004 | Benco et al. |
| 2005/0059344 A1 | 3/2005 | Chang |
| 2005/0060238 A1 | 3/2005 | Gravina et al. |
| 2005/0078834 A1 | 4/2005 | Hirschburger et al. |
| 2005/0083639 A1 | 4/2005 | Zick et al. |
| 2005/0107131 A1 | 5/2005 | Abramov |
| 2005/0156564 A1 | 7/2005 | Krieger |
| 2005/0225288 A1 | 10/2005 | Cole et al. |
| 2005/0280393 A1 | 12/2005 | Feldmann |
| 2006/0046656 A1 | 3/2006 | Yang |
| 2006/0113956 A1 | 6/2006 | Bublitz et al. |
| 2006/0135218 A1 | 6/2006 | Son et al. |
| 2006/0158608 A1 | 7/2006 | Lin |
| 2006/0206582 A1 | 9/2006 | Finn |
| 2007/0055743 A1 | 3/2007 | Pirtle et al. |
| 2007/0096691 A1 | 5/2007 | Duncan et al. |
| 2007/0161404 A1 | 7/2007 | Yasujima et al. |
| 2007/0257808 A1 | 11/2007 | Lin |
| 2007/0291973 A1 | 12/2007 | Neu et al. |
| 2008/0007207 A1* | 1/2008 | Becker ............ H01M 2/1022 320/106 |
| 2008/0007431 A1 | 1/2008 | Jacques |
| 2008/0036420 A1 | 2/2008 | Zeiler et al. |
| 2008/0045202 A1 | 2/2008 | Chan et al. |
| 2008/0075295 A1 | 3/2008 | Mayman et al. |
| 2008/0100261 A1 | 5/2008 | Glasgow et al. |
| 2008/0109734 A1 | 5/2008 | Castagna |
| 2008/0112573 A1 | 5/2008 | Huang |
| 2008/0212073 A1 | 9/2008 | Ehring |
| 2008/0232522 A1 | 9/2008 | Rofougaran et al. |
| 2008/0268912 A1 | 10/2008 | Wang |
| 2008/0268917 A1 | 10/2008 | Chang et al. |
| 2008/0297104 A1* | 12/2008 | Rao .............. H02J 7/0004 320/106 |
| 2008/0309285 A1 | 12/2008 | Choksi et al. |
| 2008/0311954 A1 | 12/2008 | Tsai et al. |
| 2008/0315829 A1 | 12/2008 | Jones et al. |
| 2008/0318642 A1 | 12/2008 | Tanaka |
| 2009/0023389 A1 | 1/2009 | Paryani |
| 2009/0066529 A1 | 3/2009 | Fukada |
| 2009/0098914 A1 | 4/2009 | Martin-Cocher et al. |
| 2009/0128090 A1 | 5/2009 | Bi |
| 2009/0240502 A1 | 9/2009 | Kemplin |
| 2009/0290745 A1 | 11/2009 | Weir et al. |
| 2009/0319063 A1 | 12/2009 | Pan |
| 2009/0322277 A1 | 12/2009 | Cargin et al. |
| 2010/0096151 A1 | 4/2010 | Östling |
| 2010/0102065 A1 | 4/2010 | Phelan |
| 2010/0117581 A1 | 5/2010 | Miwa et al. |
| 2010/0171367 A1 | 7/2010 | Kitamura et al. |
| 2010/0174390 A1 | 7/2010 | Garrett et al. |
| 2010/0177598 A1 | 7/2010 | Zhang et al. |
| 2010/0181964 A1 | 7/2010 | Huggins et al. |
| 2010/0194667 A1 | 8/2010 | Lee et al. |
| 2010/0211643 A1 | 8/2010 | Lowenthal et al. |
| 2010/0278734 A1 | 11/2010 | Bonitatibus et al. |
| 2010/0281287 A1 | 11/2010 | Doerksen et al. |
| 2010/0283624 A1 | 11/2010 | Krueger |
| 2010/0297941 A1 | 11/2010 | Doan et al. |
| 2010/0302980 A1 | 12/2010 | Ji et al. |
| 2011/0014501 A1 | 1/2011 | Scheucher |
| 2011/0050478 A1 | 3/2011 | Choi et al. |
| 2011/0057613 A1 | 3/2011 | Taguchi et al. |
| 2011/0068742 A1 | 3/2011 | McCurry et al. |
| 2011/0074353 A1 | 3/2011 | Miwa et al. |
| 2011/0081875 A1 | 4/2011 | Imamura et al. |
| 2011/0090726 A1 | 4/2011 | Brotto et al. |
| 2011/0099157 A1 | 4/2011 | Lebeau et al. |
| 2011/0128007 A1 | 6/2011 | Nishidai et al. |
| 2011/0138317 A1 | 6/2011 | Kang et al. |
| 2011/0248576 A1 | 10/2011 | Jones |
| 2011/0254692 A1 | 10/2011 | Furuta |
| 2011/0285570 A1 | 11/2011 | Shirai et al. |
| 2011/0304443 A1 | 12/2011 | Sheridan et al. |
| 2011/0313697 A1 | 12/2011 | Staton et al. |
| 2011/0316664 A1 | 12/2011 | Olcott et al. |
| 2012/0019200 A1 | 1/2012 | Abe |
| 2012/0021808 A1 | 1/2012 | Tseng |
| 2012/0025957 A1 | 2/2012 | Yang |
| 2012/0033140 A1 | 2/2012 | Xu |
| 2012/0043937 A1 | 2/2012 | Williams |
| 2012/0115549 A1 | 5/2012 | Kim et al. |
| 2012/0131364 A1 | 5/2012 | Gruet et al. |
| 2012/0174165 A1 | 7/2012 | Mondragon et al. |
| 2012/0187851 A1 | 7/2012 | Huggins et al. |
| 2012/0208481 A1 | 8/2012 | Bose |
| 2012/0217971 A1 | 8/2012 | DeLuca |
| 2012/0224698 A1 | 9/2012 | Yang |
| 2012/0235628 A1 | 9/2012 | Okabayashi et al. |
| 2012/0249384 A1 | 10/2012 | Kaikkonen et al. |
| 2012/0280867 A1 | 11/2012 | Baek et al. |
| 2012/0297960 A1 | 11/2012 | Bader |
| 2012/0302288 A1 | 11/2012 | Born et al. |
| 2012/0303851 A1 | 11/2012 | Tseng et al. |
| 2013/0054399 A1 | 2/2013 | Ben-Yaacov et al. |
| 2013/0109375 A1 | 5/2013 | Zeiler et al. |
| 2013/0120221 A1 | 5/2013 | Lindberg et al. |
| 2013/0196721 A1 | 8/2013 | Waterman et al. |
| 2013/0198867 A1 | 8/2013 | Ricci et al. |
| 2013/0201078 A1 | 8/2013 | Russello |
| 2013/0207598 A1 | 8/2013 | Teltz et al. |
| 2013/0208417 A1 | 8/2013 | Sirpal |
| 2013/0210489 A1 | 8/2013 | Jouin |
| 2013/0210494 A1 | 8/2013 | Jouin |
| 2013/0225033 A1 | 8/2013 | Achan |
| 2013/0273832 A1 | 10/2013 | Coleman |
| 2013/0273970 A1 | 10/2013 | Selim |
| 2013/0282956 A1 | 10/2013 | Ramdeo |
| 2013/0297844 A1 | 11/2013 | Rosenberg et al. |
| 2013/0335014 A1 | 12/2013 | Ashinghurst et al. |
| 2014/0003617 A1 | 1/2014 | Wang et al. |
| 2014/0008992 A1 | 1/2014 | Leabman |
| 2014/0008993 A1 | 1/2014 | Leabman |
| 2014/0009108 A1 | 1/2014 | Leabman |
| 2014/0059263 A1 | 2/2014 | Rosenberg et al. |
| 2014/0073250 A1 | 3/2014 | Singh |
| 2014/0107853 A1 | 4/2014 | Ashinghurst et al. |
| 2014/0119575 A1 | 5/2014 | Conrad et al. |
| 2014/0151079 A1 | 6/2014 | Furui et al. |
| 2014/0192480 A1 | 7/2014 | Winkler et al. |
| 2014/0295758 A1 | 10/2014 | Pedersen |
| 2015/0015192 A1 | 1/2015 | Leabman et al. |
| 2015/0022008 A1 | 1/2015 | Leabman et al. |
| 2015/0134869 A1 | 5/2015 | Graham |
| 2015/0171638 A1 | 6/2015 | Huang |
| 2016/0006280 A1 | 1/2016 | Ikeda et al. |
| 2016/0087314 A1 | 3/2016 | Arashima et al. |

FOREIGN PATENT DOCUMENTS

| | | |
|---|---|---|
| EP | 2182577 A1 | 5/2010 |
| EP | 2209160 A1 | 7/2010 |
| EP | 2219265 A1 | 8/2010 |
| JP | 2002238177 A | 8/2002 |
| JP | 2005073350 A | 3/2005 |
| JP | 2009262254 A | 11/2009 |
| JP | 2010515594 A | 5/2010 |
| JP | 2010206871 A | 9/2010 |

(56) References Cited

FOREIGN PATENT DOCUMENTS

| | | | |
|---|---|---|---|
| JP | 2010226890 | A | 10/2010 |
| JP | 2011034793 | | 2/2011 |
| JP | 2011061926 | A | 3/2011 |
| JP | 2011072138 | A | 4/2011 |
| JP | 4835697 | B2 | 12/2011 |
| JP | 2013074715 | A | 4/2013 |
| JP | 5569717 | B2 | 8/2014 |
| WO | 2006044693 | A | 4/2006 |
| WO | 2006079254 | A1 | 8/2006 |
| WO | 2007060547 | A2 | 5/2007 |
| WO | 2008041942 | A1 | 4/2008 |
| WO | 2008088266 | A1 | 7/2008 |
| WO | 2009043005 | A1 | 4/2009 |
| WO | 2010132399 | A1 | 11/2010 |
| WO | 2012071607 | A1 | 6/2012 |
| WO | 2013014914 | A2 | 1/2013 |
| WO | 2013099228 | A2 | 7/2013 |
| WO | 2013173898 | A2 | 11/2013 |

OTHER PUBLICATIONS

Office Action from the United States Patent Office dated Mar. 14, 2017 in U.S. Appl. No. 15/377,034, including examined claims 20-39.

International Search Report from parent PCT application No. PCT/JP2012/008289.

Written Opinion from parent PCT application No. PCT/JP2012/008289.

Final Office Action from the United States Patent & Trademark Office dated Jan. 25, 2018 in U.S. Appl. No. 14/633,376, and examined claims 1, 2, 4 and 5-10.

Office Action from the United States Patent Office dated Jun. 29, 2018 in U.S. Appl. No. 14/633,376 and examined claims.

Final Office Action from the United States Patent Office dated Jan. 25, 2019 in U.S. Appl. No. 14/633,376, including examined claims 1-2 and 4-10.

* cited by examiner

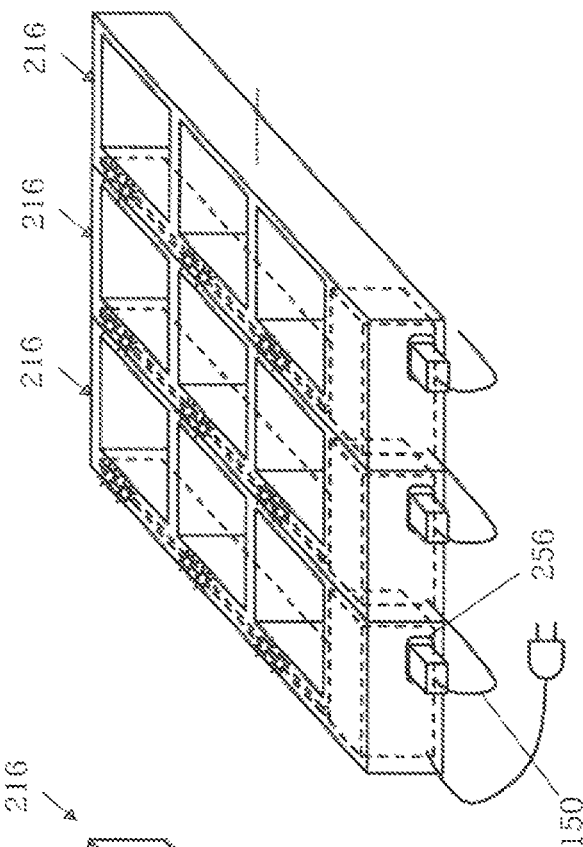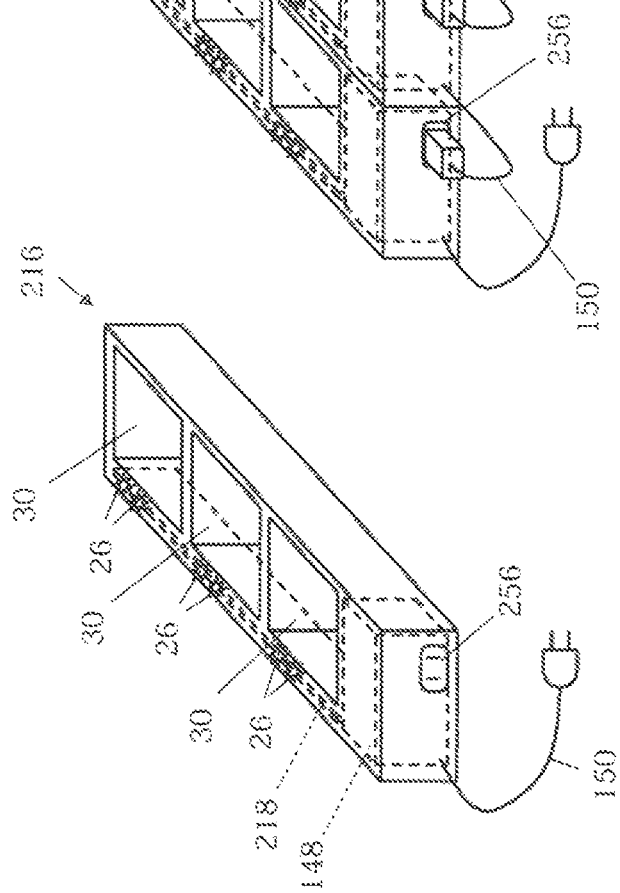

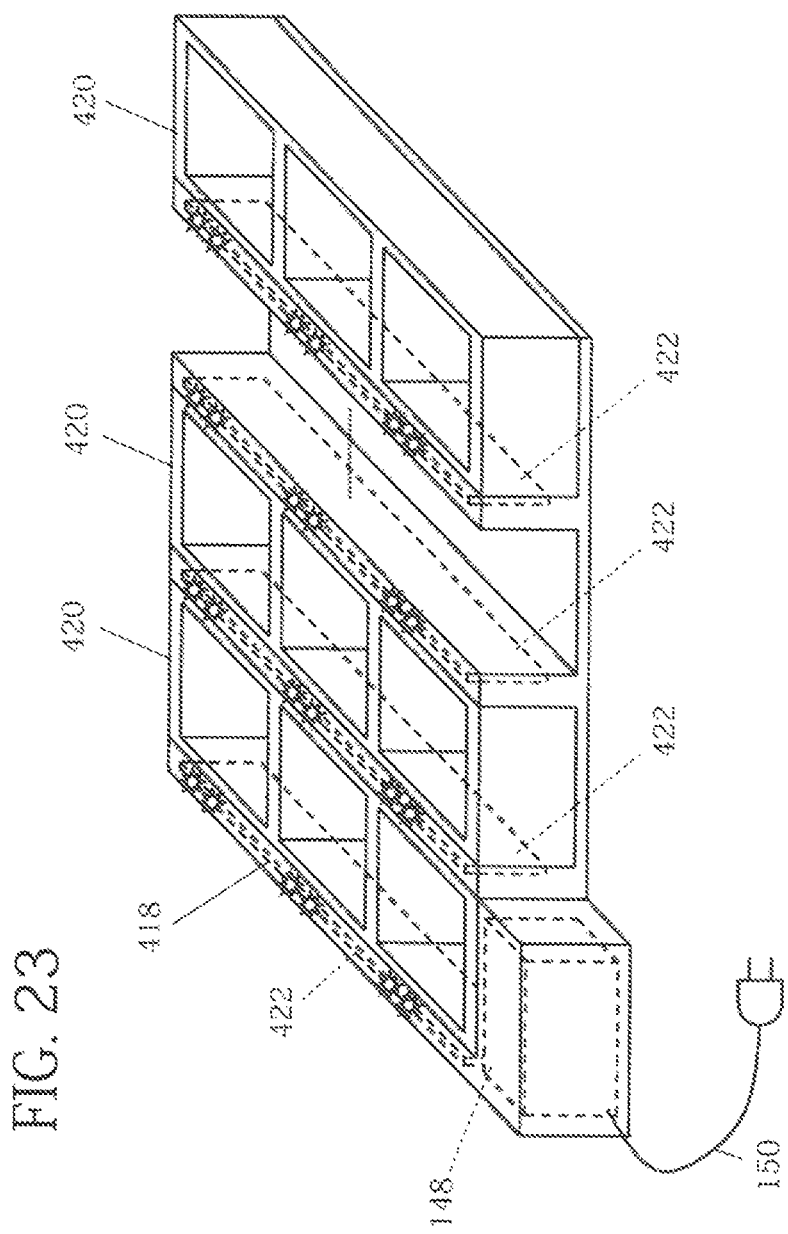

BATTERY SYSTEM FOR A POWER TOOL, AS WELL AS BATTERY HOLDER THEREFOR, CHARGER, AND CHARGING SYSTEM

CROSS-REFERENCE

The present application is a continuation of U.S. patent application Ser. No. 14/369,710, filed Jun. 29, 2014, which is the U.S. National Stage of International Application No. PCT/JP2012/008289 filed on Dec. 25, 2012, which claims priority to U.S. provisional patent application Ser. No. 61/581,943 filed on Dec. 30, 2011 and U.S. provisional patent application Ser. No. 61/702,559 filed on Sep. 18, 2012, the contents of both of which are incorporated fully herein.

TECHNICAL FIELD

The present teachings generally relate to a battery system for a power tool, as well as to a battery holder therefor, a charger, a charging system and a battery system containing the same.

BACKGROUND ART

A battery system for a power tool is disclosed in JP2002-238177A. This battery system comprises a plurality of battery packs and a charger for charging the plurality of battery packs. The charger comprises a plurality of battery interfaces, each battery interface accepting one of the battery packs, and thereby can charge the plurality of battery packs.

SUMMARY

According to the above-described known battery system, a user can simultaneously charge the plurality of battery packs with a single charger. Nevertheless, when charging the plurality of battery packs, the user must attach each battery pack of the plurality of battery packs to the charger, one at a time. Furthermore, after charging has been completed, each battery pack of the plurality of battery packs must be detached from the charger, one at a time.

It is therefore one object of the present teachings to disclose improved techniques for simply and/or conveniently charging a plurality of battery packs.

In one aspect of the present teachings, a battery pack holder (hereinafter, simply "battery holder") is configured such that a plurality of battery packs can be attached thereto and detached therefrom and such that it can be attached to and detached from a charger, i.e. it can be physically connected or coupled to the charger in a detachable manner. Furthermore, the battery holder is configured such that when the battery holder is attached to the charger, the battery packs, which are attached to the battery holder, are also electrically connected to the charger.

In another aspect of the present teachings, a battery system comprises a plurality of battery packs, the above-described battery holder, and a charger. As was noted above, the battery holder is configured such that the plurality of battery packs can be physically (mechanically) attached thereto and detached therefrom. The charger is configured such that the battery holder, to which the plurality of battery packs is attached, can be attached thereto and detached therefrom. Therefore, when the battery holder is attached to the charger, the battery packs, which are attached to the battery holder, are also electrically connected to the charger.

According to the battery system described above, the user can simultaneously attach two or more battery packs to the charger using one or more of the battery holders. After charging, the user can simultaneously detach the battery packs, which are attached to one battery holder, from the charger simply by detaching the battery holder from the charger. Thereby, the plurality of battery packs can be charged easily and conveniently. In addition, the battery holder is also advantageous for storing and/or carrying two or more of battery packs. By attaching the plurality of battery packs to the battery holder, it is possible to efficiently and conveniently organize and store the plurality of battery packs and, in addition, to easily carry them.

In another aspect of the present teachings, it is noted that some users may prefer to interchangeably use two or more battery packs with a single power tool. However, in this case, it becomes necessary to appropriately manage each individual battery pack. For example, consider a case wherein some of the battery packs are used frequently while some are not used all that much. In this case, the frequently-used battery packs will deteriorate more quickly than the battery packs that are less frequently used and the less-frequently used battery packs may maintain the performance of substantially a new unit for a relatively long time. However, if the performance (e.g., the charge storing capacity) of the battery packs varies relative to each other, then the amount of work that the power tool can perform will vary with the selected battery pack. This can result in the problem that a particular battery pack may suddenly cut off or shut down (due to a lack of charge) during a power tool operation much earlier than the user had expected. What must be heeded here is that all of the battery packs have an identical or substantially similar external appearance. Consequently, it is difficult to identify, merely by the external appearance, which of the battery packs was recently charged and which was not and/or which of the battery pack(s) has (have) deteriorated overall more than one or more other battery packs.

Therefore, in another aspect of the present teachings, improved techniques are disclosed that enable a user to more easily manage a plurality of battery packs.

In order to achieve this objection, it is proposed to transmit, from the charger to an external device, information related to the battery pack(s) attached to the charger as well as information related to the position(s) in the charger of the battery pack(s) attached thereto. As one representative, non-limiting example, the external device can be configured to display a representation of which battery pack is attached at each position by using the received information. Based upon the displayed information, the user can appropriately select, from the plurality of battery packs attached to the charger, which battery pack should be used.

The battery information mentioned above is not limited and may be any type of information that indicates or represents one or more of:

the individual and/or unique identification code of the battery pack (e.g., a unique serial number or a unique tag number), the model code of the battery pack, the rated or nominal voltage of the battery pack, the rated or nominal maximum current of the battery pack, the maximum allowable temperature of the battery pack (i.e., the highest temperature that the battery pack is permitted to reach during charging, which charging parameter may be changed (updated) during the service life of the battery pack and may be determined based upon (i) the condition of the battery cells therein and/or (ii) the user's preference), the maximum current experienced by the battery pack during its lifetime, the maximum temperature experienced by the battery pack during its lifetime, the usage start date of the battery pack, the total charges count of the battery pack (i.e. the total number of times that the battery pack has been (re)charged), the total discharges count of the battery pack (i.e. the total number of times that the battery pack has been used or discharged after having been charged), the total discharge time of the battery pack, and the name of the administrator or manager of the battery pack.

In accordance with another aspect of the present teachings, a battery system may comprise: a plurality of battery packs and a charger configured to simultaneously charge the plurality of battery packs. Each of the battery packs comprises battery memory or storage, which stores at least battery information (e.g., one or more types of information mentioned in the preceding paragraphs, wherein it should be understood that all possible combinations thereof are considered to be explicitly disclosed herein). The charger comprises a plurality of battery interfaces, a charger memory or storage, at least one charger controller, and a charger communication circuit, which is directly or indirectly connected to the charger memory and the charger controller. Each of the battery interfaces is configured such that one battery pack can be attached thereto and detached therefrom. The charger memory or storage stores interface identification information assigned to each of the battery interfaces. The charger controller communicates with the battery memory of each of the battery packs attached to each of the battery interfaces and acquires the battery information stored therein. The charger communication circuit transmits the battery information acquired from the battery memory of the given battery pack, together with the interface identification information of the battery interface whereto that battery pack is attached, to an external device, e.g., the above-mentioned external device.

The greater the number of battery interfaces that the charger has, the greater the number of battery packs that can be charged simultaneously. Nevertheless, each user may possess a different number of battery packs, such that a user who possesses a large number of battery packs will require a correspondingly large number of battery interfaces if the user wishes to be able to simultaneously charge most or all of the battery packs in his/her possession. On the other hand, if the user possesses only two or three battery packs, two or three battery interfaces would be sufficient. Taking this point into consideration, the charger preferably has a structure that enables a desired or optimal number of battery interfaces to be provided based upon the user's particular circumstances (i.e. the number of battery packs in his/her possession). That is, the charger's charging capacity preferably is easily expandable or scalable to adjust to the user's needs.

For example, in one representative embodiment of this aspect of the present teachings, the charger preferably comprises at least one master charger and at least one slave charger. The plurality of battery interfaces preferably comprises a plurality of first battery interfaces, which is provided to, in or on the master charger(s), and a plurality of second battery interfaces, which is provided to, in or on the slave charger(s). The charger memory preferably comprises a first charger memory, which is provided to or in the master charger(s), and a second charger memory, which is provided to or in the slave charger(s). The first charger memory is configured to store the interface identification information assigned to the first battery interface. The second charger memory is configured to store the interface identification information assigned to the second battery interface. The charger controller preferably comprises a first charger controller, which is provided to or in the master charger(s), and a second charger controller, which is provided to or in the slave charger(s). Furthermore, the first charger controller and the second charger controller are configured such that they communicate with one another. According to this configuration, by attaching a greater number of the slave chargers to the master charger(s), a suitable number of battery interfaces can be provided in accordance with the number of battery packs possessed by the user.

In addition, the first charger controller preferably is configured such that differing interface identification information is assigned to each of the first battery interfaces and to each of the second battery interfaces. The first charger memory preferably is configured to store the interface identification information assigned to the first battery interface; and the second charger memory preferably is configured to store the interface identification information assigned to the second battery interface.

As used herein, the term "configured" is intended to be interchangeable or replaceable with the term "adapted" with no difference in meaning.

Further objects, embodiments, advantages and designs of the present teachings will be explained in the following, or will become apparent to the skilled person, with the assistance of the exemplary embodiments and the appended Figures.

BRIEF DESCRIPTION OF DRAWINGS

FIGS. 16A and 16B show the external appearance of chargers of a second embodiment.

FIG. 23 is a modified example of the fourth embodiment and shows the charger, which comprises a plurality of the tray units.

DETAILED DESCRIPTION

Figure 1:
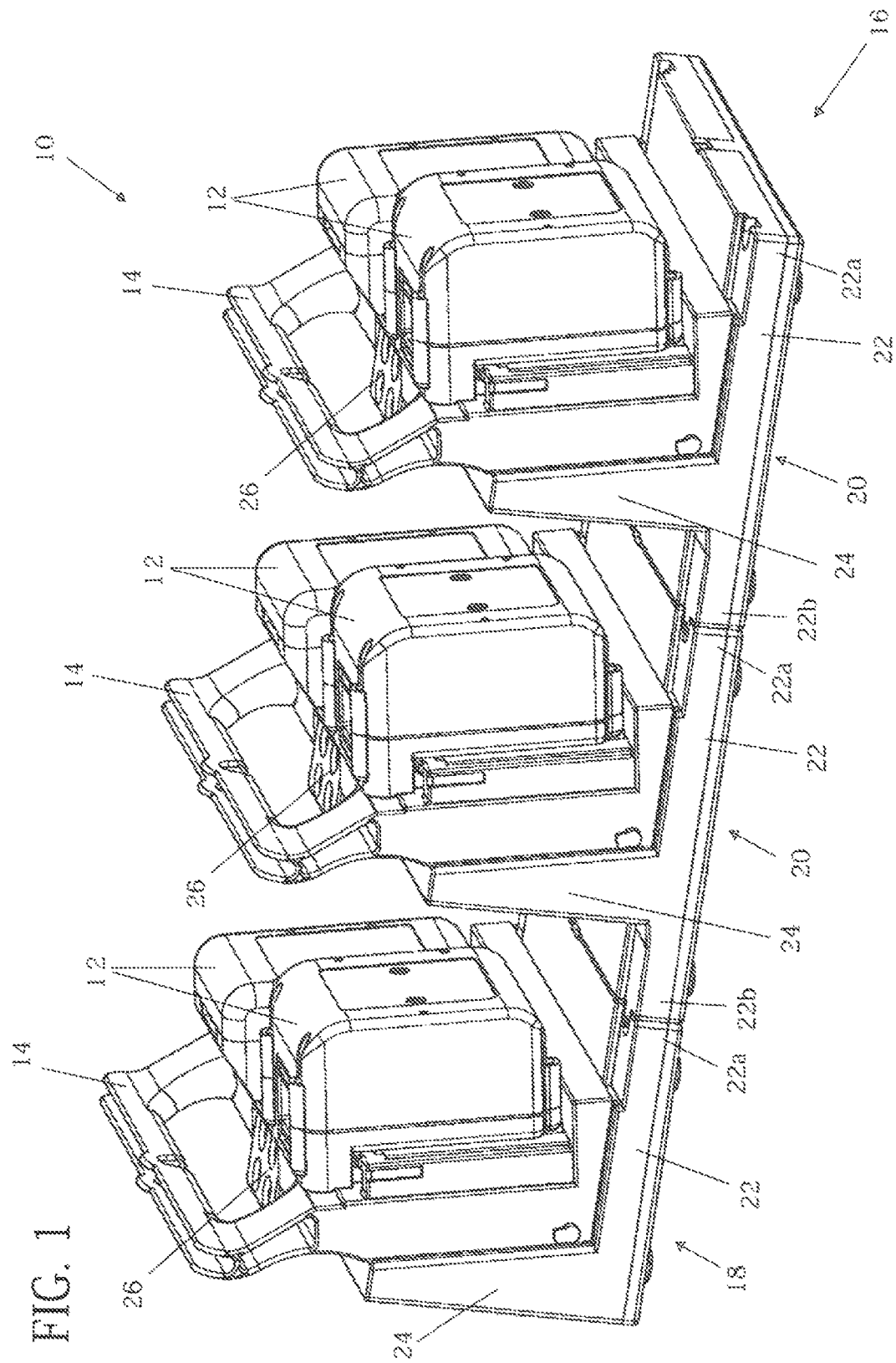
FIG. 1 and FIG. 2 show the external appearance of a battery system of a first embodiment.

In one embodiment of the present teachings, a charger preferably comprises a plurality of battery interfaces. In this case, each of the battery interfaces preferably accepts (electrically communicates with) one corresponding battery pack.

Each of the battery interfaces preferably comprises at least one charging output terminal, which outputs charging current (power) to the battery pack. The charging output terminal may be a contact-type terminal or a noncontact-type (i.e. wireless/inductive) terminal, as will be further discussed below.

Each of the battery interfaces preferably comprises a battery engaging part, which mechanically engages with the corresponding battery pack. As one representative, non-limiting example, the battery engaging part preferably comprises at least one slide rail (preferably two), which slidably engages with at least one corresponding or complementary slide rail (preferably two) on the battery pack.

Each of the battery interfaces is preferably configured such that, even if there is no battery holder, one battery pack can be directly attached to and detached from the battery interface, i.e. with no interleaved battery holder between the battery interface of the charger (either master or slave) and the battery pack. Therefore, the battery pack still can be charged even when the battery holder cannot be used (e.g., when the battery holder has been lost or has broken).

In another embodiment of the present teachings, each of the battery packs is preferably configured such that it can be attached to and detached from the charger until the battery holder has been attached to the charger. According to this configuration, one or more of the plurality of battery packs attached to the charger can be selectively detached from the charger. For example, when the charging of one or more of the battery packs has been completed, the charged battery packs can be detached and immediately used without waiting for the completion of the charging of the other battery packs.

In another embodiment of the present teachings, one of the battery pack and the battery holder preferably includes a movable hook, and the other preferably includes a hook receiving part (e.g., a wall having an aperture therein), which is configured to engage with the movable hook so that the battery pack is releasably locked or latched to the battery holder. According to this configuration, the battery pack can be prevented from inadvertently coming off of the battery holder.

In another embodiment of the present teachings, the battery holder preferably comprises a handle. According to this configuration, a user can easily carry the battery holder by holding the handle.

In another embodiment of the present teachings, the battery holder preferably has a shape such that the attached plurality of battery packs are prevented from making contact with the surface, e.g., the ground or a dirty/wet floor, on which the battery holder has been placed. According to this configuration, when the battery holder that has been detached from the charger is placed, e.g., on the ground, the battery pack can be prevented from getting dirty or wet.

In another embodiment of the present teachings, the battery holder preferably comprises a holder engaging part, which is configured to releasably engage with another battery holder. According to this configuration, the user can easily carry or store two battery holders that have been attached to each other.

The holder engaging part preferably is capable of engaging with another battery holder in the state wherein at least one battery pack is attached to the battery holder. According to this configuration, the user can easily carry or store two battery holders, each having one or more battery packs attached thereto.

In another embodiment of the present teachings, the battery holder is preferably configured as a single member or an integral unit (i.e. having no seams between its various parts). However, the battery holder may be configured as two or more discrete or separate members or parts that are attached to each other using a fastener, e.g., screw, bolt, adhesive, clamp, etc. The material of the battery holder is not particularly limited and can be selected in consideration of factors such as function and price. For example, the battery holder can comprise a thermoplastic resin—such as polypropylene (PP), polyethylene (PE), and/or polyethylene terephthalate (PET)—or some other resin material.

In another embodiment of the present teachings, a charger communication circuit is configured such that it can receive information or a signal transmitted from the above-mentioned external device.

In the above-mentioned embodiment, the charger communication circuit is preferably configured such that it receives charger update information, which updates an operation condition, one or more operating parameters (e.g., one or more charging parameters) and/or an operating program (e.g., charging program, i.e. a program containing instructions for performing a charging operation when executed) stored in the charger.

In addition to or in the alternative, the charger communication circuit preferably may be configured such that it receives an operation instruction signal that is intended for the charger. In this case, the charger communication circuit is preferably configured such that it further receives interface identification information of the battery interface that is the target of the operation instruction signal.

In addition to or in the alternative, the charger communication circuit preferably is configured such that it receives battery update information, which updates an operation condition, an operation parameter or stored value, or an operating program stored in the battery pack. In this case, the charger communication circuit is preferably configured such that it further receives the interface identification information of the battery interface whereto is attached the battery pack to which the battery update information is to be applied. Furthermore, the charger controller is preferably configured such that the received battery update information is sent to the battery pack that is attached to the battery interface corresponding to the received interface identification information.

In another embodiment of the present teachings, the charger communication circuit is preferably configured such that it wirelessly communicates with the external device. However, the charger communication circuit may be configured to communicate with the external device via a wire or otherwise wired connection.

The external device utilized with the present teachings is not particularly limited and may preferably be a mobile phone, a smart phone, a tablet computer, or some other computer apparatus, e.g., a lightweight, portable computing device, such as a personal data assistance or portable media player. The external device preferably comprises means for wirelessly communicating with at least the master charger, e.g., using Bluetooth®, Wi-Fi®, infrared, cordless or cellular telephony, radio signals or any other wireless communication protocol now known or developed subsequent hereto. However, the external device may also be, e.g., a desktop computer, server, mainframe, etc. that is not readily portable.

First Embodiment

Figure 2:
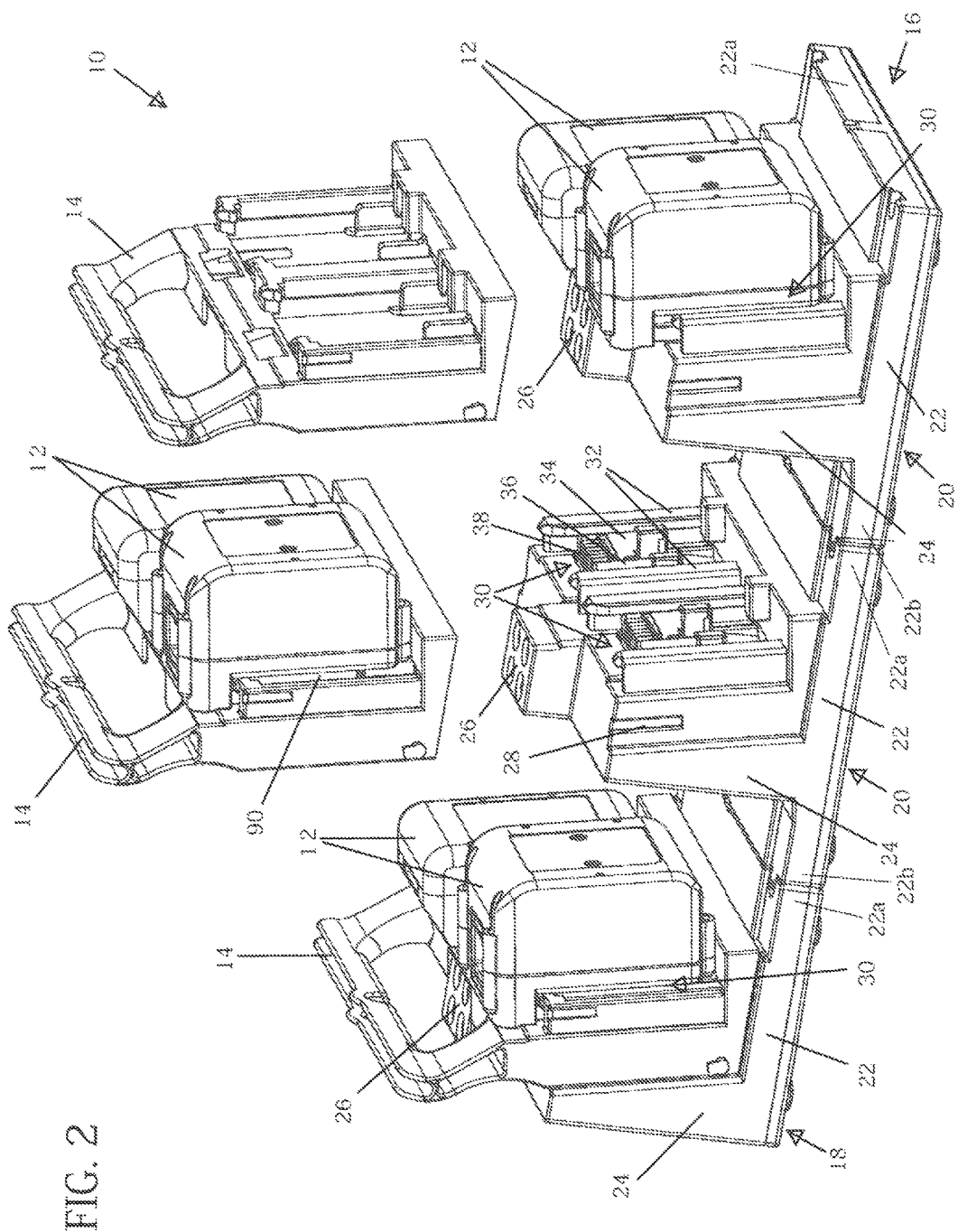

A battery system 10 of a first embodiment will now be explained. The battery system 10 is designed to supply electric current (power) to a power tool. As shown in FIG. 1 and FIG. 2, the battery system 10 preferably comprises a plurality of battery packs 12, a plurality of battery holders 14, and a charger 16.

The battery packs 12 serve as power supplies for the power tool. The battery packs 12 are configured such that they are capable of attaching to and detaching from the power tool in order to supply the stored electric power to the power tool. The battery packs 12 are charged by the charger 16. The plurality of battery packs 12 may be identical or may include two or more different types of battery packs, e.g., having different capacities, different rated (nominal) voltages, etc.

Each of the battery holders 14 is configured such that at least two of the battery packs 12 can be attached thereto and detached therefrom; in the present embodiment, two battery packs 12 are detachably attachable to each battery holder 14. Each of the battery holders 14 may be configured such that three or more battery packs 12 can be attached thereto and detached therefrom. Furthermore, each of the battery holders 14 can be formed of, for example, a resin material, e.g., PP, PE and/or PET. In addition, the battery holders 14 may be formed entirely, or only in part, of a metal, if strength is of importance, or may have one or more metal reinforcements embedded in a resin shell.

The charger 16 is configured to charge a plurality of the battery packs 12. The charger 16 is also configured such that the battery holders 14 can be attached thereto and detached therefrom in the state wherein two or more battery packs 12 are attached to each battery holder 14. When two or more battery holders 14 are attached to the charger 16, all of the battery packs 12 attached to the battery holders 14 are electrically connected to the charger 16. Thereby, all of the battery packs 12 can be simultaneously charged by the charger 16.

According to the battery system 10 of the present embodiment, the user can simultaneously attach a plurality of the battery packs 12 to the charger 16 using one or more of the battery holders 14. After charging, the battery packs 12 attached to a single battery holder 14 can be simultaneously detached from the charger 16 by detaching the battery holder 14 from the charger 16. Therefore, two or more battery packs 12 can be charged easily and conveniently.

The battery system 10 will now be explained in further detail below. As shown in FIG. 1 and FIG. 2, the charger 16 comprises a master charger 18 and one or more slave chargers 20 (e.g., two in the present embodiment). The master charger 18 and the slave charger(s) 20 are connected in series. The charger 16 can charge an even greater number of the battery packs 12 by providing (i.e. connecting in series) a greater number of the slave chargers 20.

Figure 3:
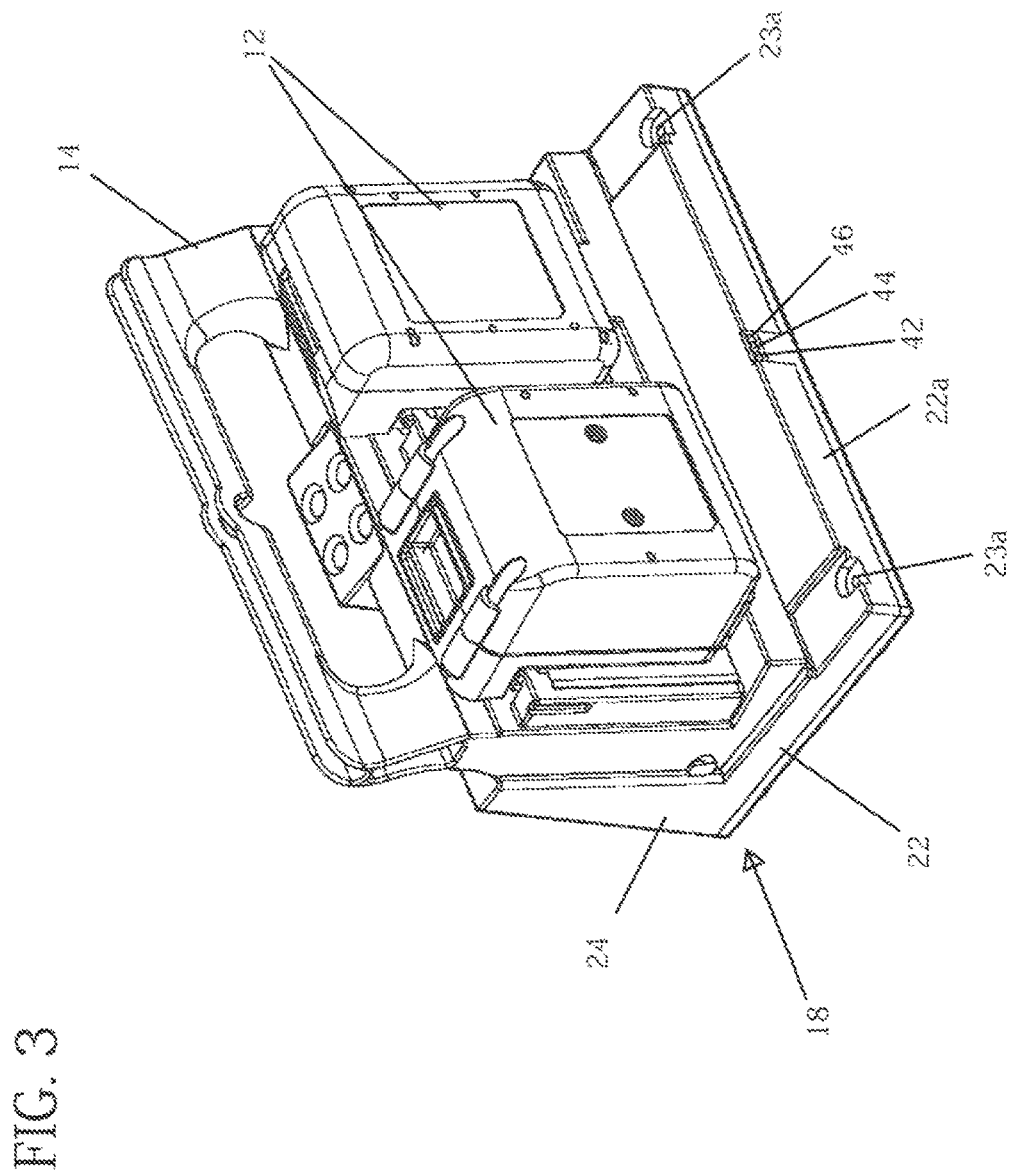
FIG. 3 shows the external appearance of a master charger.
Figure 4:
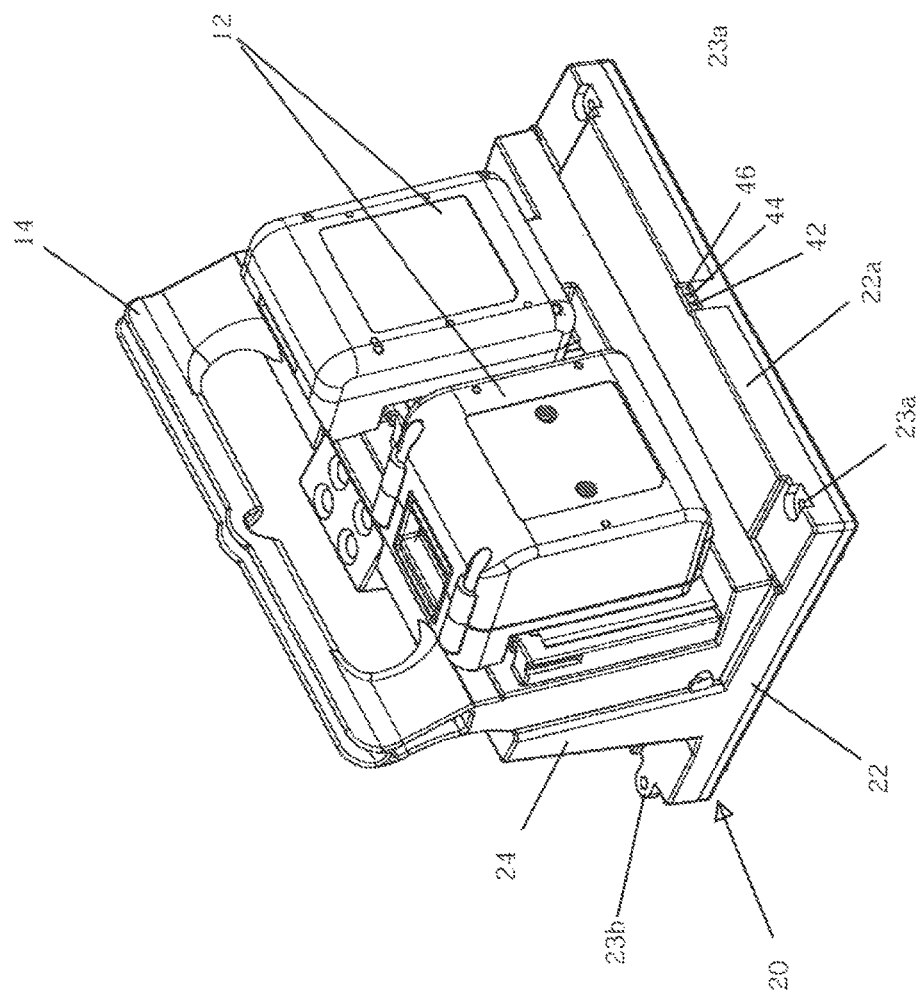
FIG. 4 and FIG. 5 show the external appearance of a slave charger.
Figure 5:
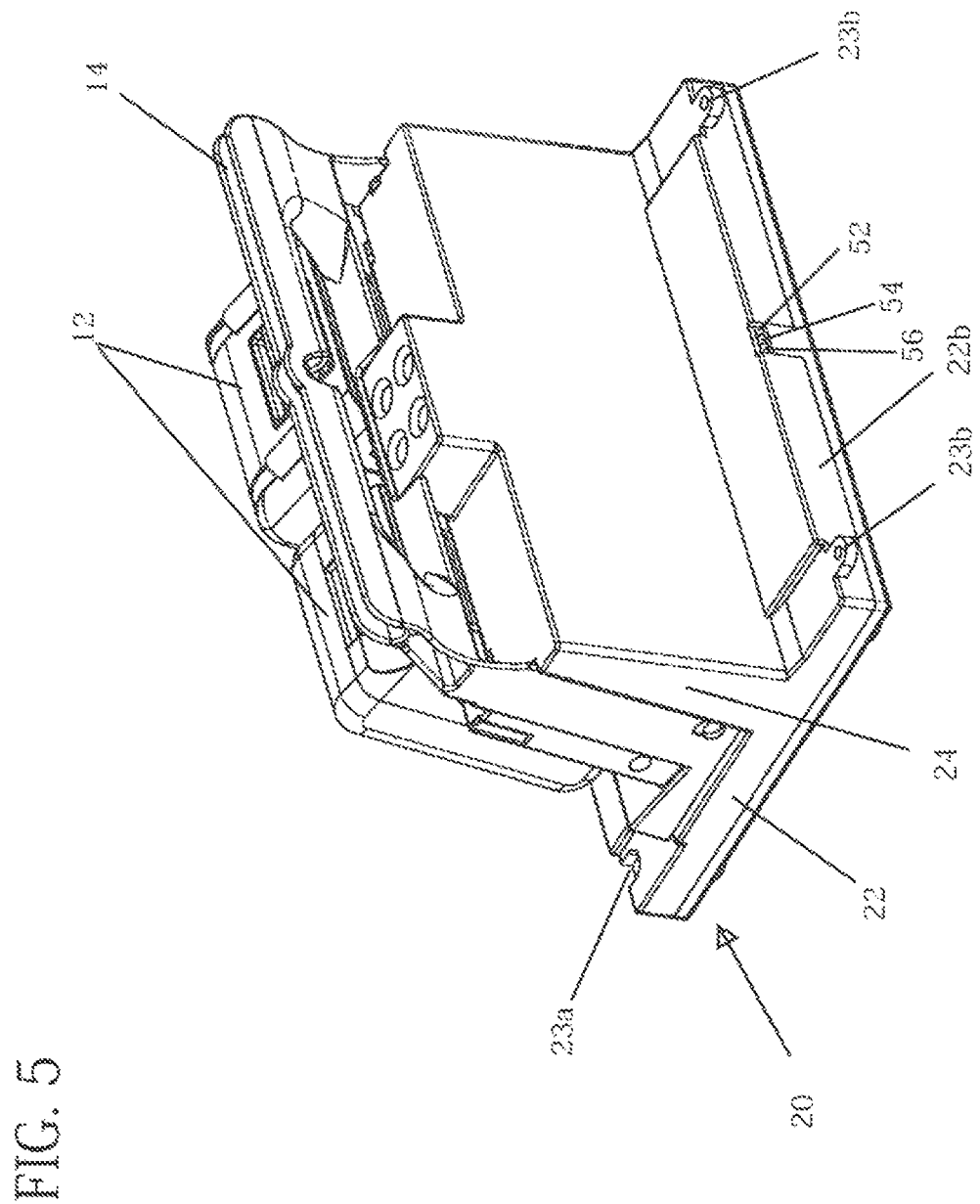

The master charger 18 and the slave charger(s) 20 each comprise a base part 22 and a wall part 24, which extends upward from the base part 22. A front end part 22a of the base part 22 is configured such that it is capable of mechanically or physically coupling with a rear end part 22b of another base part 22. As shown in FIG. 3 and FIG. 4, both of the master charger 18 and the slave charger 20 have a pair of coupling recessed parts 23a, a positive output terminal 42, a negative output terminal 44, and a communication connection terminal 46 provided on the front end part 22a of the base part 22. As shown in FIG. 5, the slave charger 20 has a pair of coupling protruding parts 23b, a positive input terminal 52, a negative input terminal 54, and a communication connection terminal 56 provided on the rear end part 22b of the base part 22.

The two coupling protruding parts 23b of the slave charger 20 are configured such that they mechanically couple with the pair of coupling recessed parts 23a of the master charger 18 or of another slave charger 20. The coupling protruding part 23b and the coupling recessed part 23a, when coupled together in an interference fit, can be fixed or attached together more securely, e.g., by a screw, a pin or a snap-fit connector. Thereby, the slave chargers 20 can mechanically couple to the master charger 18 or to another slave charger 20. When the slave charger 20 is coupled to the master charger 18 or to another slave charger 20, the positive input terminal 52, the negative input terminal 54, and the communication connection terminal 56 of the slave charger 20 are electrically connected to the positive output terminal 42, the negative output terminal 44, and the communication connection terminal 46, respectively, of the master charger 18 or the other slave charger 20. Thereby, the master charger 18 and the plurality of slave chargers 20 are physically coupled and electrically connected.

As shown in FIG. 1 and FIG. 2, the master charger 18 and each slave charger 20 of the plurality of slave chargers 20 comprises a display part (display) 26. The display part 26 is provided on an upper surface of the wall part 24, but also could be provided, e.g., on a lateral side surface of the wall part 24. The display part 26 may be driven to display various pieces of information such as "charging in progress" and "charging completed", as appropriate. As shown in FIG. 2, an engaging groove 28 configured to engage with the battery holder 14 is provided on each of two side surfaces of the wall part 24. A plurality of (e.g., two) battery interfaces 30 is provided on a front surface of the wall part 24. When the battery holder 14 is attached to the charger 16, each of the battery interfaces 30 accepts and connects to one associated battery pack 12 that is attached to the battery holder 14.

As further shown in FIG. 2, each of the battery interfaces 30 comprises a pair of slide rails 32, a positive charging output terminal 34, a negative charging output terminal 36, and charging communication terminals 38. The pair of slide rails 32 is merely one representative example of an engaging part configured to engage with the battery pack 12, and other types of engaging structures may be utilized to construct the engaging part, such as other types of interference-fitting structures.

The slide rails 32 slidably engage with a pair of engaging grooves 90, which are provided in the battery pack 12. The positive charging output terminal 34 and the negative charging output terminal 36 output charging current (power) to the battery pack 12. The charging communication terminals 38 connects with the battery pack 12 to enable electronic communications therebetween, as will be further discussed below.

In the present embodiment, each wall part 24 of the master charger 18 and the plurality of slave chargers 20 is provided with two battery interfaces 30. In addition, the front surface of the wall part 24 is inclined slightly with respect to the vertical plane. By providing the battery interface 30 on such an inclined surface, the attachment of the battery pack 12 to the battery holder 14 (and detachment therefrom) is made easier.

As further shown in FIG. 2, the charger 16 is configured such that the battery packs 12 can be directly attached thereto and detached therefrom without using the battery holder 14. Therefore, the user can charge the battery packs 12 even when the battery holders 14 are unavailable. In addition, each of the battery packs 12—with the battery holders 14 attached to the charger 16 as is—can be attached to and detached from the battery holders 14 and the charger 16. Therefore, when the charging of one of the battery packs 12 is complete, that fully-charged battery pack 12 can be removed and immediately used without waiting for the completion of the charging of the other battery packs 12.

Figure 6:
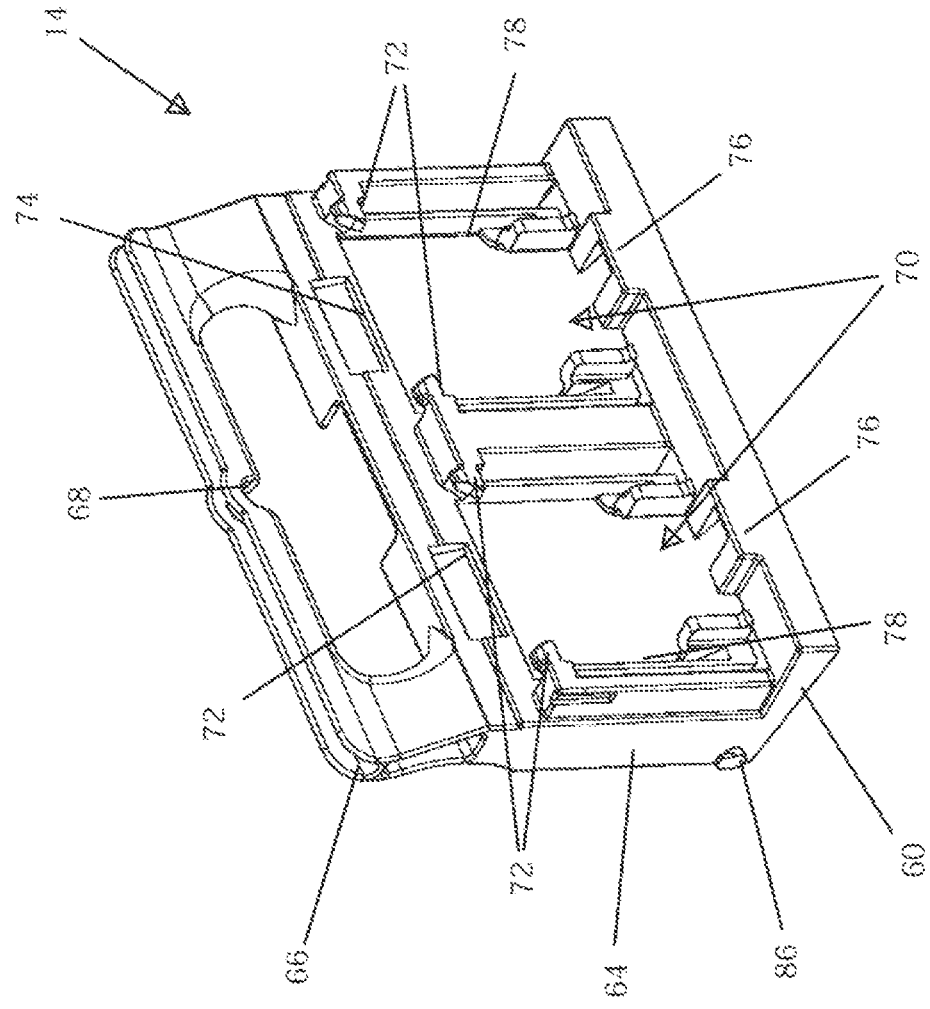
FIG. 6 shows the external appearance of a battery holder.

Next, an exemplary configuration of the battery holder 14 will now be explained in further detail. As shown in FIG. 6, the battery holder 14 preferably comprises a base part 60, a wall part 64, and a handle 66. The wall part 64 extends upward from the base part 60. The handle 66 is provided on the upper surface of the wall part 64. The handle 66 is configured such that the user may grasp it. The handle 66 is inclined rearward with respect to the wall part 64 such that the handle 66 does not interfere with the attachment or detachment of the battery packs 12. A recessed part 68 is configured to allow the battery holder 14 to be hung on a hook or peg and is preferably provided at the center of the handle 66. The battery holder 14 of the present embodiment is formed of a resin material and is configured as a single or unitary member, i.e. it is formed of a single resin material with no seams between any of its various parts.

Of course, the battery holder 14 can be formed from a material other than resin. For example, the battery holder 14 may be formed of a metal, if strength is of importance, or may have one or more metal reinforcements embedded in a resin shell.

Figure 7:
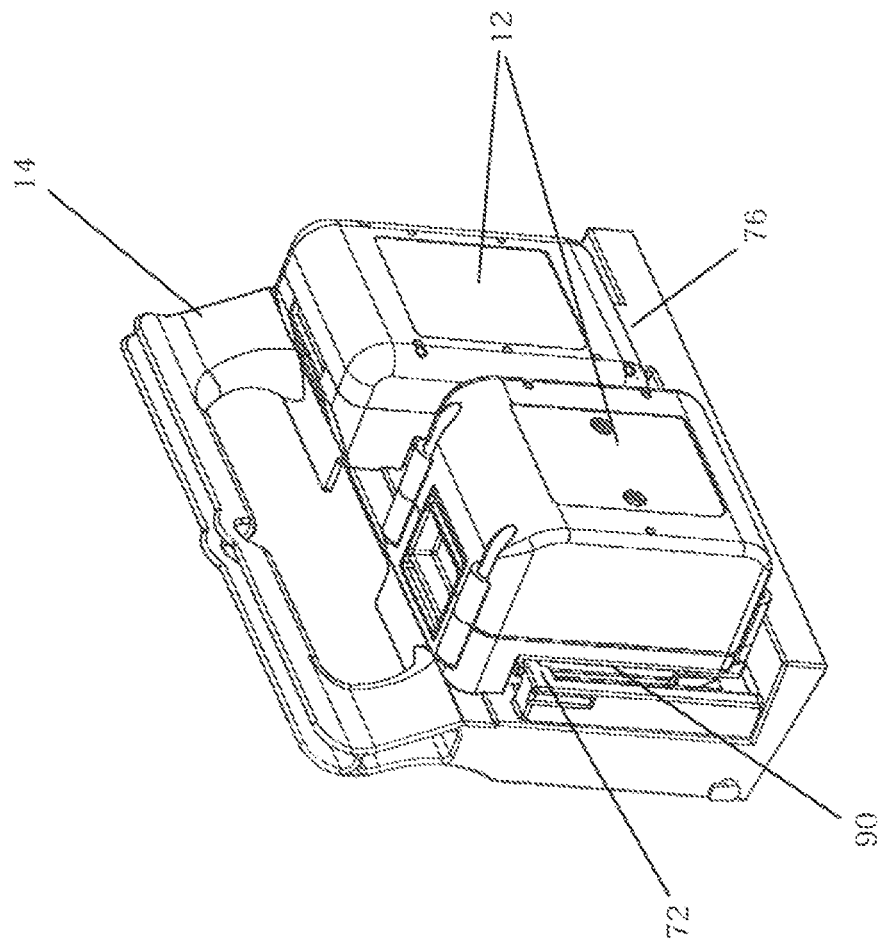
FIG. 7 and FIG. 8 show the battery holder having a plurality of battery packs attached thereto.
Figure 8:
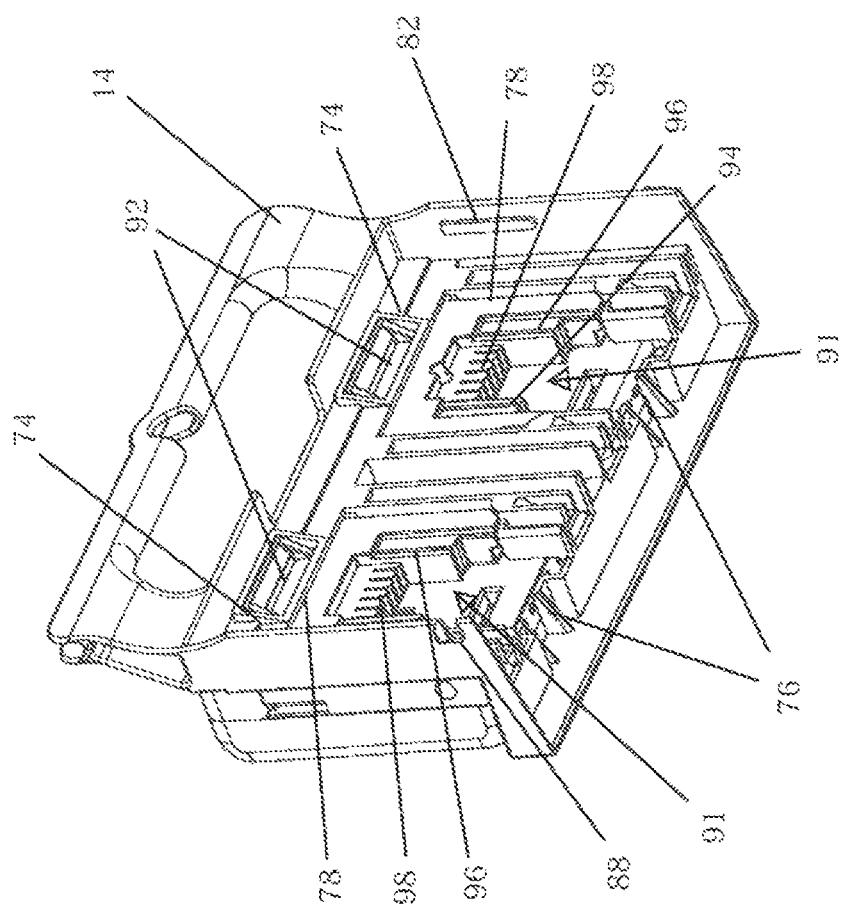

As shown in FIG. 6, the battery holder 14 comprises a plurality of (e.g., two) battery holding parts 70. The battery holding parts 70 are provided on the front surface of the wall part 64. Each of the battery holding parts 70 comprises a pair of engaging latches 72, a hook receiving part 74, and a lower support part 76. In addition, a comparatively large opening (aperture) 78 is formed in each of the battery holding parts 70. As shown in FIG. 7 and FIG. 8, the pair of engaging latches 72 is configured to engage with the pair of engaging grooves 90 provided in the battery packs 12. The hook receiving parts 74 are configured to engage with movable hooks 92, which are provided on each of the battery packs 12. The lower support part 76 is configured to support and shield or isolate the battery pack 12 from below. As a result of these configurations, the battery holding part 70 can firmly hold the battery pack 12. In addition, the battery holder 14 has a shape that can shield the attached plurality of battery packs 12 when the battery holder 14 is set down on a surface, e.g., the ground (soil) or a dirty/wet floor, so that the battery packs 12 do not make contact with a surface that could contaminate the battery packs 12.

As shown in FIG. 8, the opening 78 of each of the battery holding parts 70 exposes a connecting part 91 of the corresponding battery pack 12. The connecting part 91 of each of the battery packs 12 is configured to connect to the corresponding battery interface 30 of the charger 16. Each of the connecting parts 91 comprises a battery positive terminal 94, a battery negative terminal 96, and battery communication terminals 98. The battery positive terminal 94, the battery negative terminal 96, and the battery communication terminals 98 are terminals designed to electrically connect to the positive charging output terminal 34, the negative charging output terminal 36, and the charging communication terminals 38, respectively, of the corresponding battery interface 30.

Figure 9:
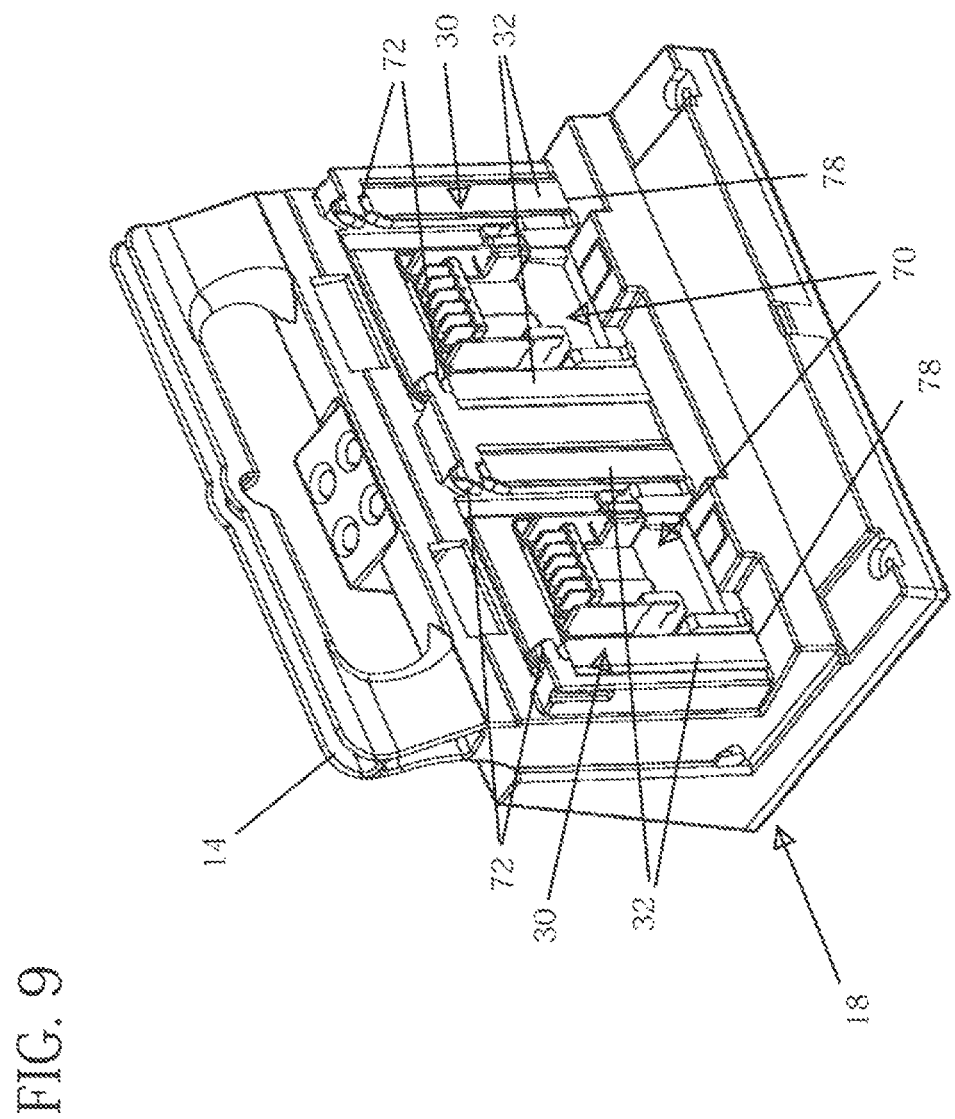
FIG. 9 shows the master charger having the battery holder attached thereto.

As shown in FIG. 9, when the battery holder 14 is attached to the master charger 18, the opening 78 of each of the battery holding parts 70 exposes the corresponding battery interface 30 of the master charger 18. Accordingly, the connecting part 91 of each of the battery packs 12 can directly connect to the corresponding battery interface 30 through the opening 78 of the corresponding battery holding part 70. In addition, the engaging latches 72 of each of the battery holding parts 70 integrate with the slide rails 32 of the corresponding battery interface 30 to constitute a series of slide rails. Thereby, even when the battery holder 14 is used, the battery packs 12 can directly engage with the pair of slide rails 32 of the battery interfaces 30. The explanation above applies equally (in the same manner) to the slave chargers 20, i.e. the slave chargers 20 may have the same features as the master charger 18 in this respect.

Figure 10:
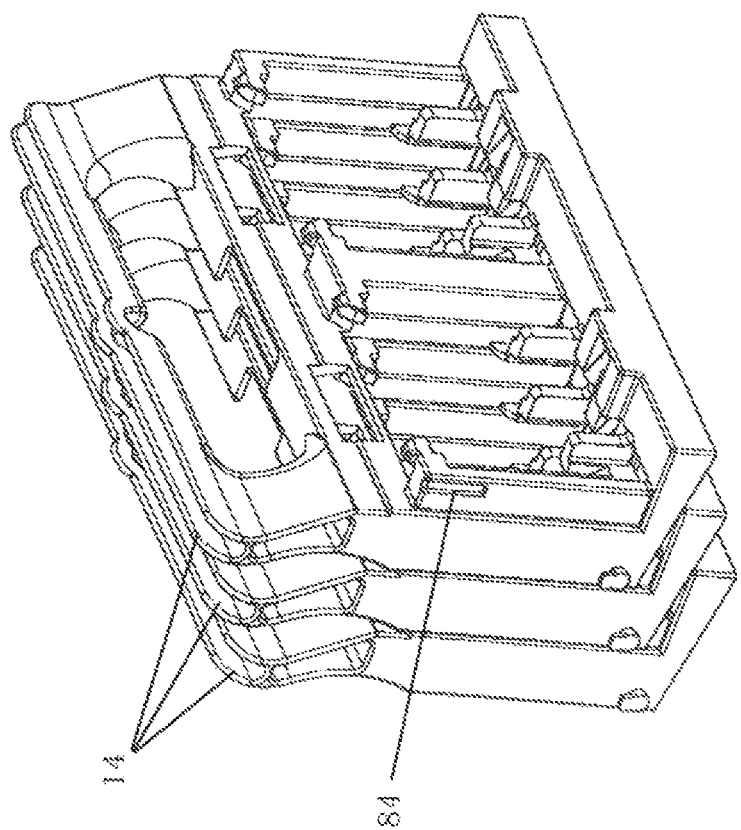
FIG. 10 and FIG. 11 show a plurality of the battery holders coupled to one another.
Figure 11:
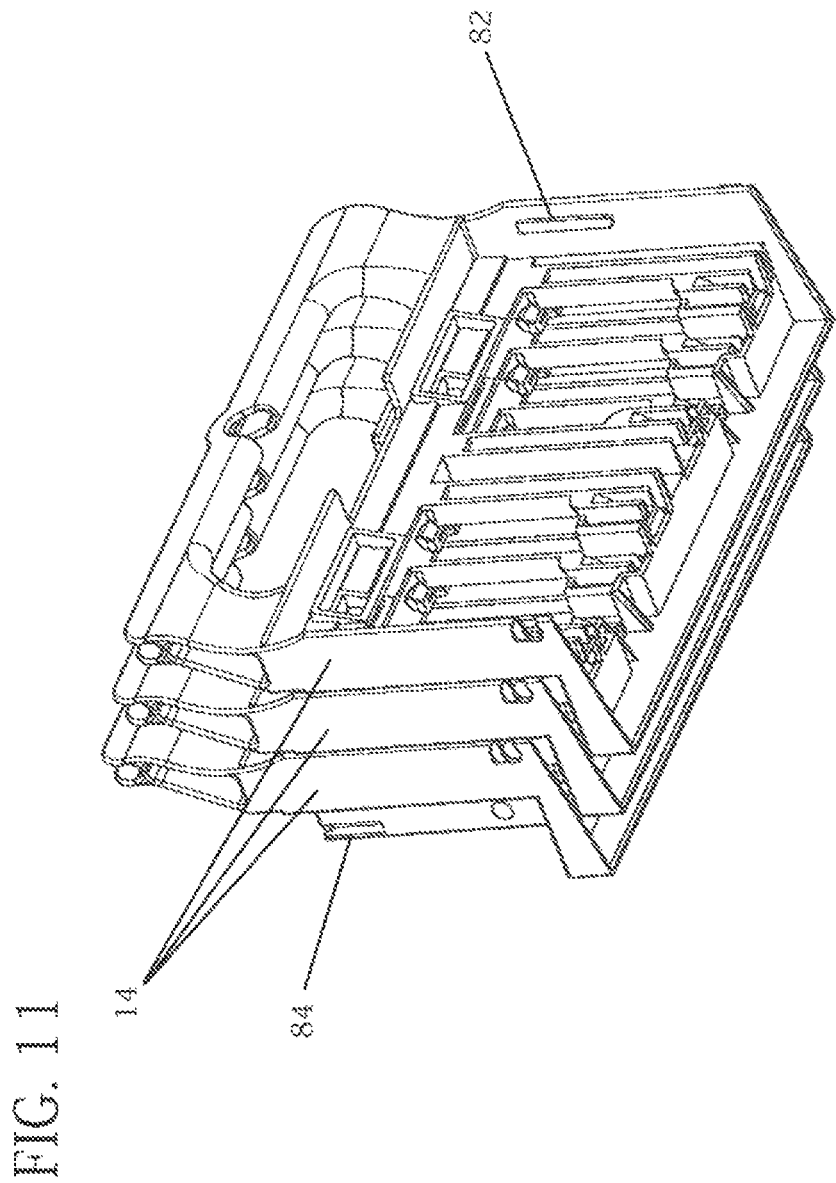

As shown in FIG. 10 and FIG. 11, the battery holders 14 also are configured to be coupled to one another. In an arrangement, in which the battery holders 14 are engaged front-to-back (or vice versa), engaging grooves 84 formed or defined in outer surfaces of both side walls of each of the battery holders 14 engage with engaging projections 82 formed or defined in inner surfaces of both side walls of the adjacent battery holder 14. Therefore, the battery holders 14 can be attached or mechanically coupled to one another by disposing (e.g., sliding) the projections 82 in the corresponding grooves 84. As will be appreciated, when the battery holder 14 is attached to the charger 16, the engaging projections 82 of the battery holder 14 engage with the engaging grooves 28 of the charger 16. Therefore, the engaging projections 82 can serve two different engagement purposes.

Figure 12:
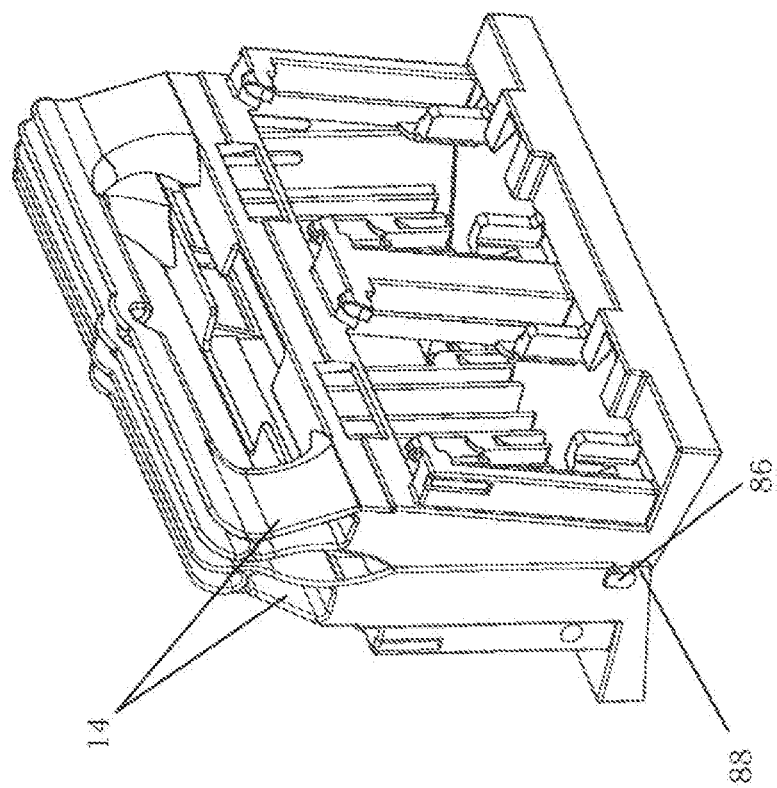
FIG. 12 shows two of the battery holders coupled to one another back-to-back.
Figure 13:
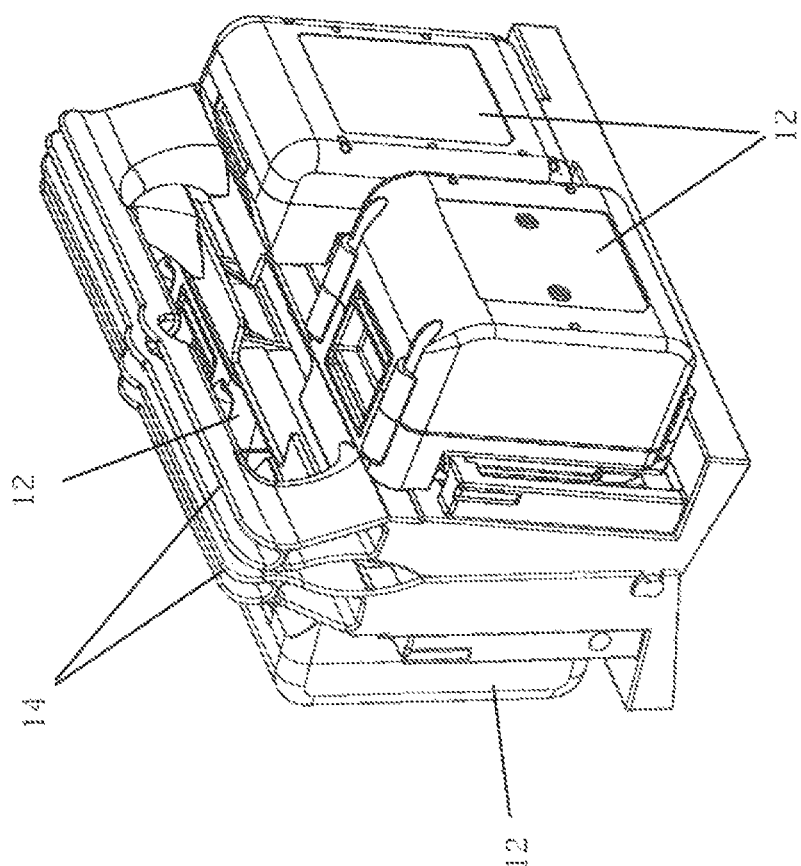
FIG. 13 shows two of the battery holders, which are coupled to one another back-to-back in the state wherein a plurality of the battery packs is attached thereto.

As shown in FIG. 12, two battery holders 14 also can be coupled to one another back-to-back. In this arrangement, an engaging projection 86, which is formed in one of the side surfaces of the battery holder 14, engages with an engaging groove 88, which is formed in the other or mutually-opposing side surface in the back-to-back coupling arrangement. Thus, the two battery holders 14 are fixed or attached to one another by disposing (e.g., sliding) the projections 86 into the grooves 88. Furthermore, in this back-to-back engagement arrangement, the two battery holders 14 can be engaged with one another even when one or more battery packs 12 is attached to the battery holders 14 as shown in FIG. 13. In this case, the user can easily carry a relatively large number of the battery packs 12, for example, to a work site.

Figure 14A:
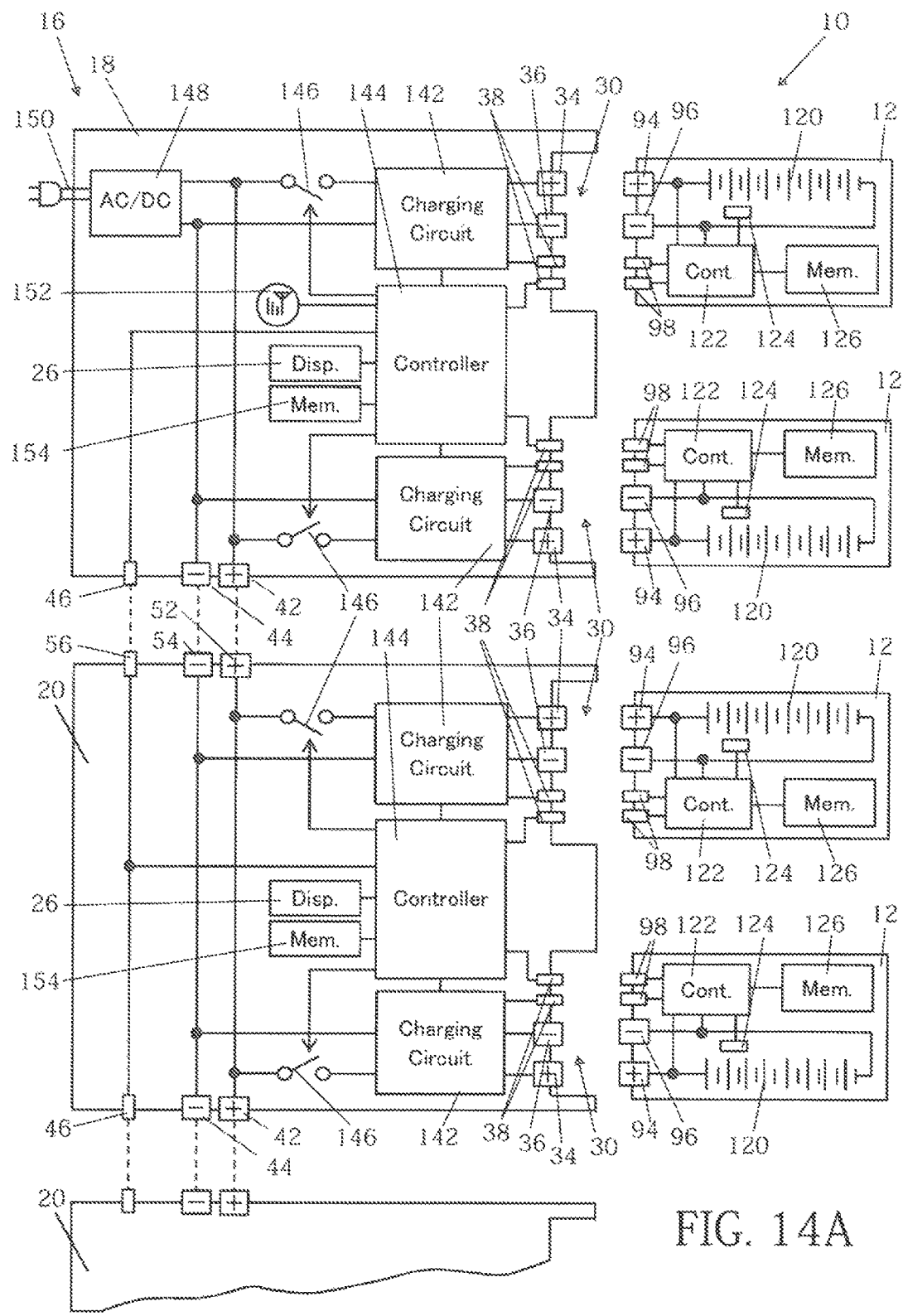
FIG. 14A shows a representative electric circuit diagram of a battery system according to the preceding Figures.

Next, a representative electric circuit configured to perform various functions of the battery system 10 will be explained. As shown in FIG. 14A, each battery pack 12 comprises a plurality of battery cells 120, at least one battery controller 122, at least one temperature sensor 124, and at least one battery memory 126. The battery cells 120 of the present embodiment are preferably lithium-ion cells, although a variety of battery chemistries may be advantageously utilized with the present teachings. The plurality of battery cells 120 is connected to the battery positive terminal 94 and the battery negative terminal 96. The battery controller 122 is connected to the battery cells 120 and can detect the voltage of the plurality of battery cells 120. In addition, the battery controller 122 can estimate the charge level and the internal resistance of the battery cells 120 based on the detected voltage of the battery cells 120. The temperature sensor 124 is disposed in the vicinity of the plurality of battery cells 120 and detects the temperature of the plurality of battery cells 120. The temperature sensor 124 is connected to the battery controller 122, and the battery controller 122 inputs the detected temperature of the battery cells 120. The battery controller 122 is connected to the battery communication terminals 98.

The battery memory 126 stores battery information. This battery information preferably includes at least one, or any arbitrary combination of two or more, of the following: an individual identification code (ID) of the battery pack 12; the model code of the battery pack 12; the rated voltage of the battery pack 12; the rated current of the battery pack 12; the maximum permissible temperature of the battery pack 12; the maximum current experienced by the battery pack 12; the maximum temperature experienced by the battery pack 12; the usage start date of the battery pack 12; the total charges count of the battery pack 12; the total discharges count of the battery pack 12; the total discharge time of the battery pack 12; and the administrator of the battery pack 12. The battery memory 126 is connected to the battery controller 122. The battery controller 122 can read, update (overwrite), and delete the battery information stored in the battery memory 126.

The master charger 18 and the slave charger(s) 20 each comprise a plurality of charging circuits 142 and at least one charger controller 144. In addition, the master charger 18 comprises an AC/DC converter 148. The AC/DC converter 148 is connectable to an external AC power supply via a power cord 150. The AC/DC converter 148 transforms or converts the AC power from the external AC power supply into DC power. The DC power output from the AC/DC converter 148 is supplied to each of the charging circuits 142 of the master charger 18 and the slave chargers 20. Each of the charging circuits 142 is connected to one corresponding battery interface 30 and controls the charging current (power) supplied from that battery interface 30 to the corresponding battery pack 12. A cutoff switch 146 is provided between the AC/DC converter 148 and each of the charging circuits 142. Each of the cutoff switches 146 is controlled by the corresponding charger controller 144. When one of the battery packs 12 is attached to the corresponding battery interface 30, the corresponding charger controller 144 closes the corresponding cutoff switch 146 so that it conducts current. When that battery pack 12 is detached from the battery interface 30 or when the charging of that battery pack 12 is complete, the charger controller 144 opens the cutoff switch 146 so that it becomes non-conductive.

The master charger 18 and the slave charger(s) 20 each further comprises at least one charger memory 154 connected to the at least one charger controller 144. The charger memory 154 stores the interface identification information assigned to each of the battery interfaces 30. The interface identification information may be a serial number or a series of integers, for example, "1," "2", "3". The interface identification information is assigned by the charger controller 144 of the master charger 18. The charger controller 144 of the master charger 18 specifies, for the entire charger 16—including the master charger 18 and the one or more slave chargers 20—how many of the battery interfaces 30 are present by communicating with the charger controller 144 of each of the slave chargers 20. Furthermore, the interface identification information is assigned to each of the battery interfaces 30. The assigned interface identification information is stored in the charger memories 154 of the master charger 18 and the slave chargers 20.

In the master charger 18 and the slave chargers 20, when the battery pack(s) 12 is (are) attached to the battery interface(s) 30, the charger controller 144 is connected to the (respective) battery controller(s) 122 so as to enable communication therebetween. Subsequently, the charger controller 144 acquires, from each battery controller 122, the battery information stored in the corresponding battery memory 126. In addition, the charger controller 144 can acquire, from each battery controller 122, a state indication of the corresponding battery pack(s) 12. The state indication of each of the battery packs 12 includes, for example, at least one, or any arbitrary combination of two or more, of the following: the charge level of the battery pack 12; the output voltage of the battery pack 12; the internal resistance of the battery pack 12; the temperature of the battery pack 12, and the charging elapsed time of the battery pack 12. The charger controller 144 stores the acquired battery information and state indication of each of the battery packs 12 in the charger memory 154. The battery information and the state indication of each of the battery packs 12 are stored in the corresponding charger memory 154 together with the interface identification information of the battery interface 30 whereto that battery pack 12 is attached.

The master charger 18 further comprises a communication circuit 152. The communication circuit 152 is connected to the charger controller 144. The communication circuit 152 can connect, either wirelessly or via a wired connection, to the external device so as to enable communication therebetween. The charger controller 144 can send and receive information or a signal to and from the external device via the communication circuit 152. The external device referred to herein may be any of the above-described external devices, such as, without limitation, a mobile phone, a smart phone, a tablet computer, or some other (e.g., portable) computer apparatus. The wireless communication method or protocol is not particularly limited, as was further discussed above. While the communication circuit 152 preferably communicates with the external device wirelessly, it may also or instead communicate via a wired line, such as e.g., a USB connection.

Figure 15:
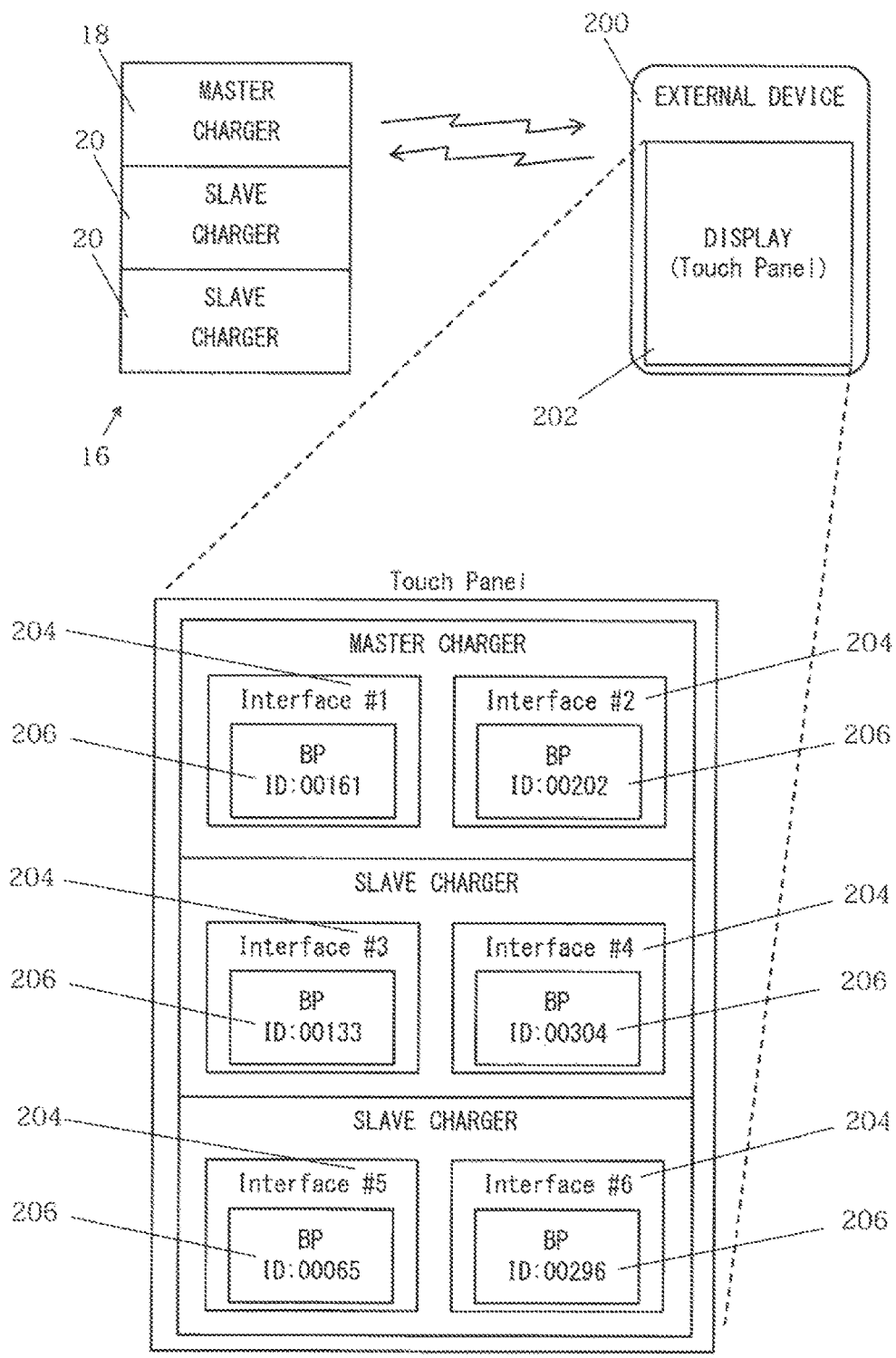
FIG. 15 shows a charger configured to communicate with an external device.

FIG. 15 shows one example of information that the charger 16 may be configured to transmit to an external device 200 (e.g., a smart phone). In this example, the battery information and the state indication of the battery pack 12 are transmitted, together with the interface identification information of the battery interface 30 whereto that battery pack 12 is attached, from the charger 16 to the external device 200. As a result of these communications, a display 202 (e.g., a touch panel or touch screen) of the external device 200 can collectively display interface identification information 204 of the battery interface 30, and an individual identification code 206 of the battery pack 12 attached to that battery interface 30. Based on this display, the user is informed as to what type of battery pack 12 is attached to each of the battery interfaces 30 of the charger 16. The display 202 of the external device 200 may further display other battery information, state information, etc. of the battery pack 12. For example, if the charge level is further displayed on the display 202, then it is possible to easily specify or identify which battery pack 12 of the plurality of battery packs 12 attached to the charger 16 has completed charging. In addition, the display 202 can be configured to display information concerning the state of deterioration of the battery pack 12 attached thereto, e.g., whether the battery pack 12 is still in a new or pristine condition or, at the opposite extreme, whether the battery pack 12 is nearing the end of its useful service life, such that it should be used less frequently (as was discussed above) or not at all.

In addition, the charger 16 can be configured to receive charger update information and/or operation instruction signals from the external device 200. The charger update information may be utilized to change the operation condition, operating parameters and/or the operating (e.g., charging) program stored in the charger 16. Upon receiving the charger update information, the charger 16 can update the stored operation condition, operating parameter and/or operating program. The operation instruction signal may be, e.g., a charging started signal or a charging stopped signal, for instructing the charger 16 to perform various operations. In this case, the operation instruction signal is preferably received together with the interface identification information of the battery interface 30 that is the target of that operation instruction signal. According to such a configuration, the user can specify (select) a specific battery interface 30 and start or stop the charging of that battery interface 30.

Furthermore, the charger 16 can be configured to also receive battery update information. The battery update information may include data for changing the operation condition, operating parameters and/or an operating program stored in the battery pack 12. In this case, the battery update information is preferably received together with the interface identification information of the battery interface 30 whereto the battery pack 12 to which the battery update information is to be applied is attached. According to this type of configuration, the charger controller 144 of the charger 16 can selectively send received battery update information to the battery pack 12 that is attached to the battery interface 30 corresponding to the received interface identification information.

The charger 16 discussed above comprises the master charger 18 and the one or more slave chargers 20 and is configured such that those chargers 18, 20 are coupled. However, the charger 16 of the present system 10 is not limited to such a configuration. For example, the modified example of the charger 16 shown in FIG. 14B has a configuration wherein the master charger 18 and the plurality of slave chargers 20 discussed above are integrated, e.g., permanently connected together.

Figure 14B:
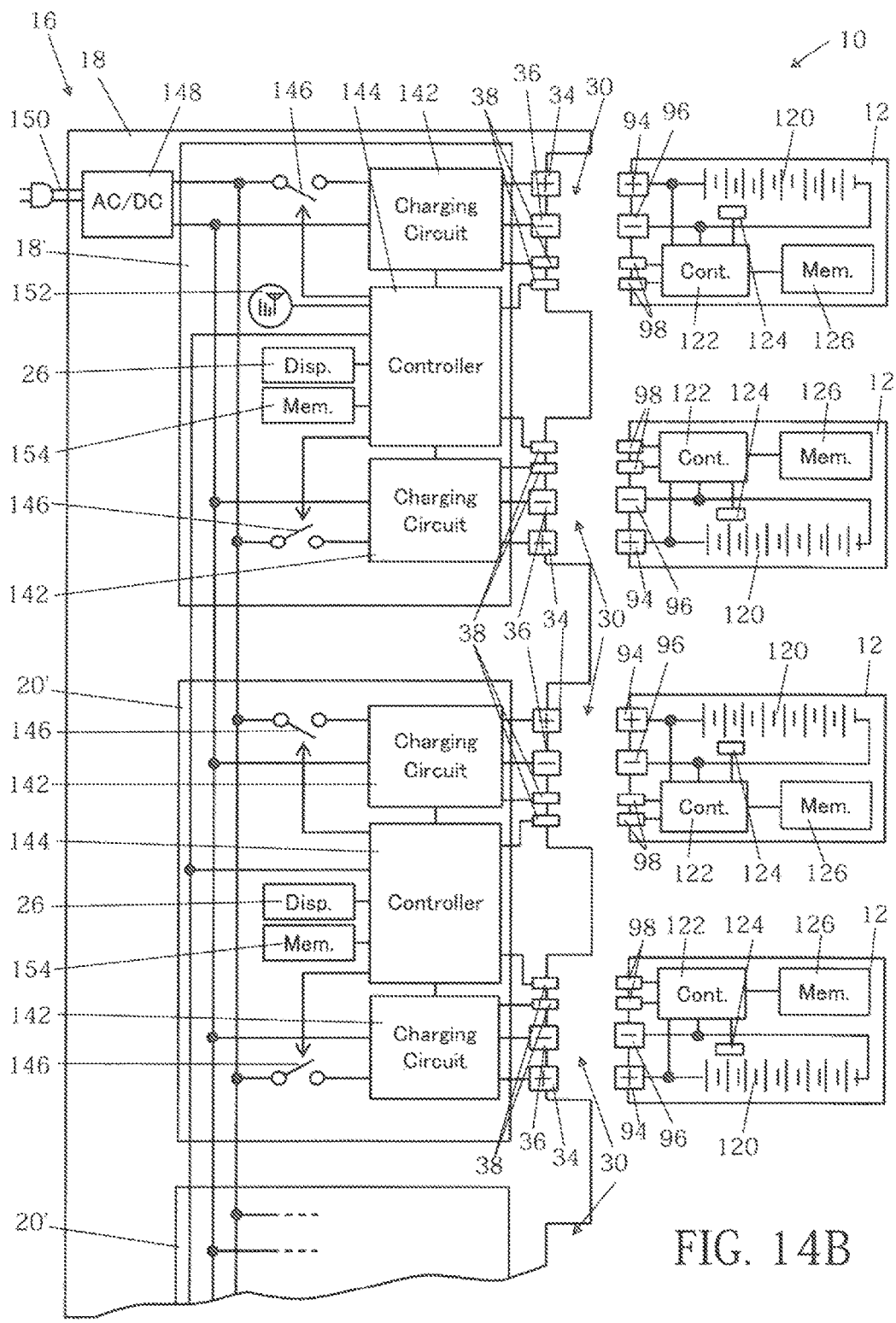
FIG. 14B shows a representative electric circuit diagram of a battery system, which comprises an integrated charger.

In the embodiment of FIG. 14B, the charger 16 comprises, inside one main body wherein the plurality of battery interfaces 30 is provided, a master circuit board 18' and one or more slave circuit boards 20'. The master circuit board 18' comprises the plurality of charging circuits 142, the at least one charger controller 144, the plurality of cutoff switches 146, the charger memory 154, and the communication circuit 152. These components may have the same, or substantially the same, configuration and functions as the charging circuits 142, the charger controller 144, the cutoff switches 146, the charger memory 154, and the communication circuit 152, respectively, of the master charger 18 discussed above. Likewise, the (each) slave circuit board 20' comprises the plurality of the charging circuits 142, the at least one charger controller 144, the plurality of cutoff switches 146, and the charger memory 154. Similarly, these components may also have the same, or substantially the same, configuration and functions as the charging circuits 142, the charger controller 144, the cutoff switches 146, and the charger memory 154, respectively, of the slave charger 20 discussed above. Therefore, a repetition of the design and function of these components may be omitted.

Figure 14C:
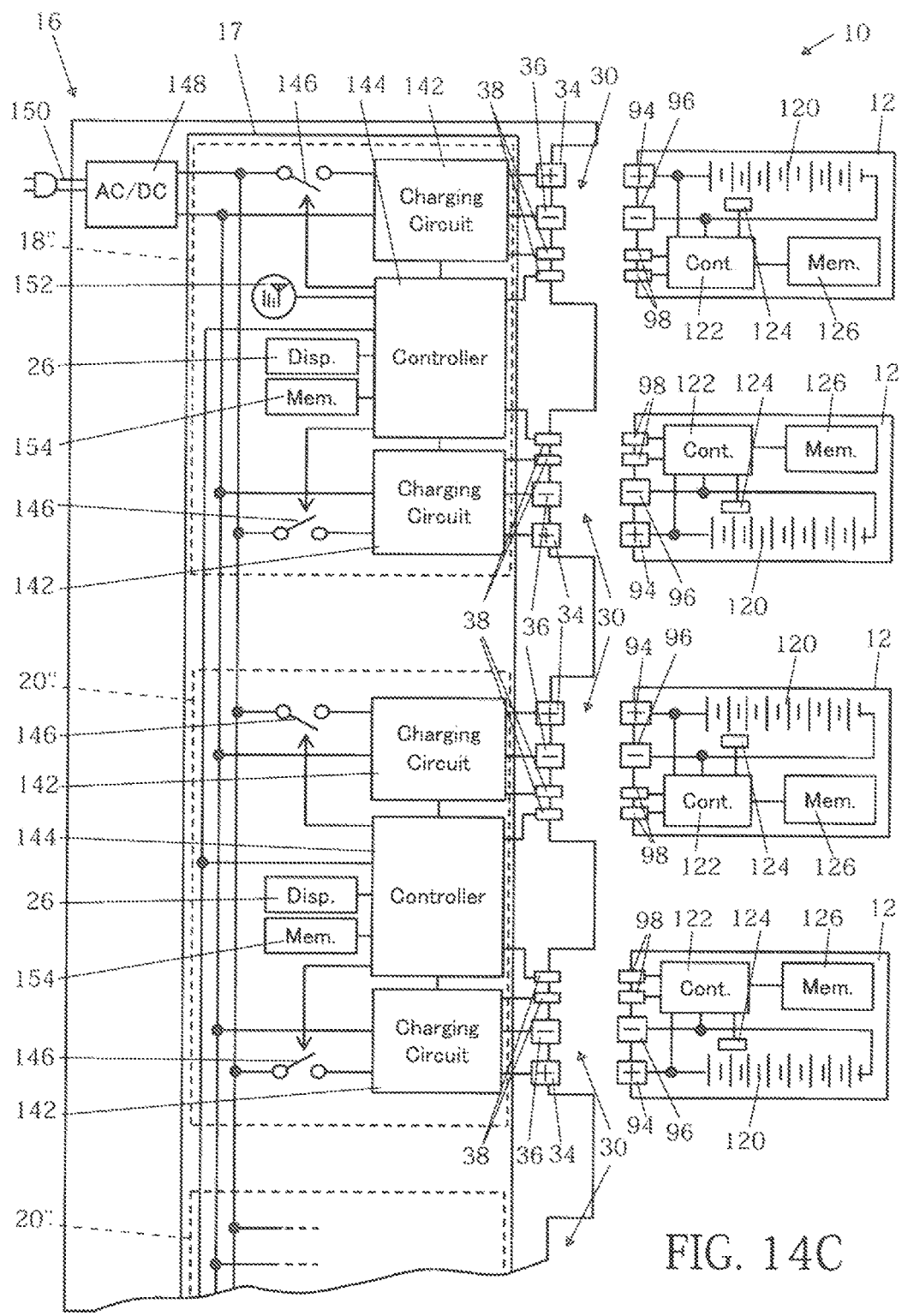
FIG. 14C shows another representative electric circuit diagram of a battery system, which comprises an integrated charger.

Another modified example of the charger 16, which is shown in FIG. 14C, also has a configuration wherein the master charger 18 and the plurality of slave chargers 20 discussed above are integrated, e.g., permanently connected together.

In the embodiment of FIG. 14C, the charger 16 has a single common circuit board 17 inside the single main body wherein the plurality of battery interfaces 30 is provided. The common circuit board 17 comprises a master circuit block 18" and a plurality of slave circuit blocks 20". The master circuit block 18" comprises the plurality of the charging circuits 142, the charger controller 144, the plurality of cutoff switches 146, the charger memory 154, and the communication circuit 152. Similar to the embodiment of FIG. 14B, these components may all have the same, or substantially the same, configuration and functions as the charging circuits 142, the charger controller 144, the cutoff switches 146, the charger memory 154, and the communication circuit 152, respectively, of the master charger 18 discussed above. Likewise, the slave circuit block 20" comprises the plurality of charging circuits 142, the charger controller 144, the plurality of cutoff switches 146, and the charger memory 154. Again, these components may all have the same, or substantially the same, configuration and functions as the charging circuits 142, the charger controller 144, the cutoff switches 146, and the charger memory 154, respectively, of the slave charger 20 discussed above. Therefore, a repetition of the design and function of these components may be omitted.

Second Embodiment

Figure 17:
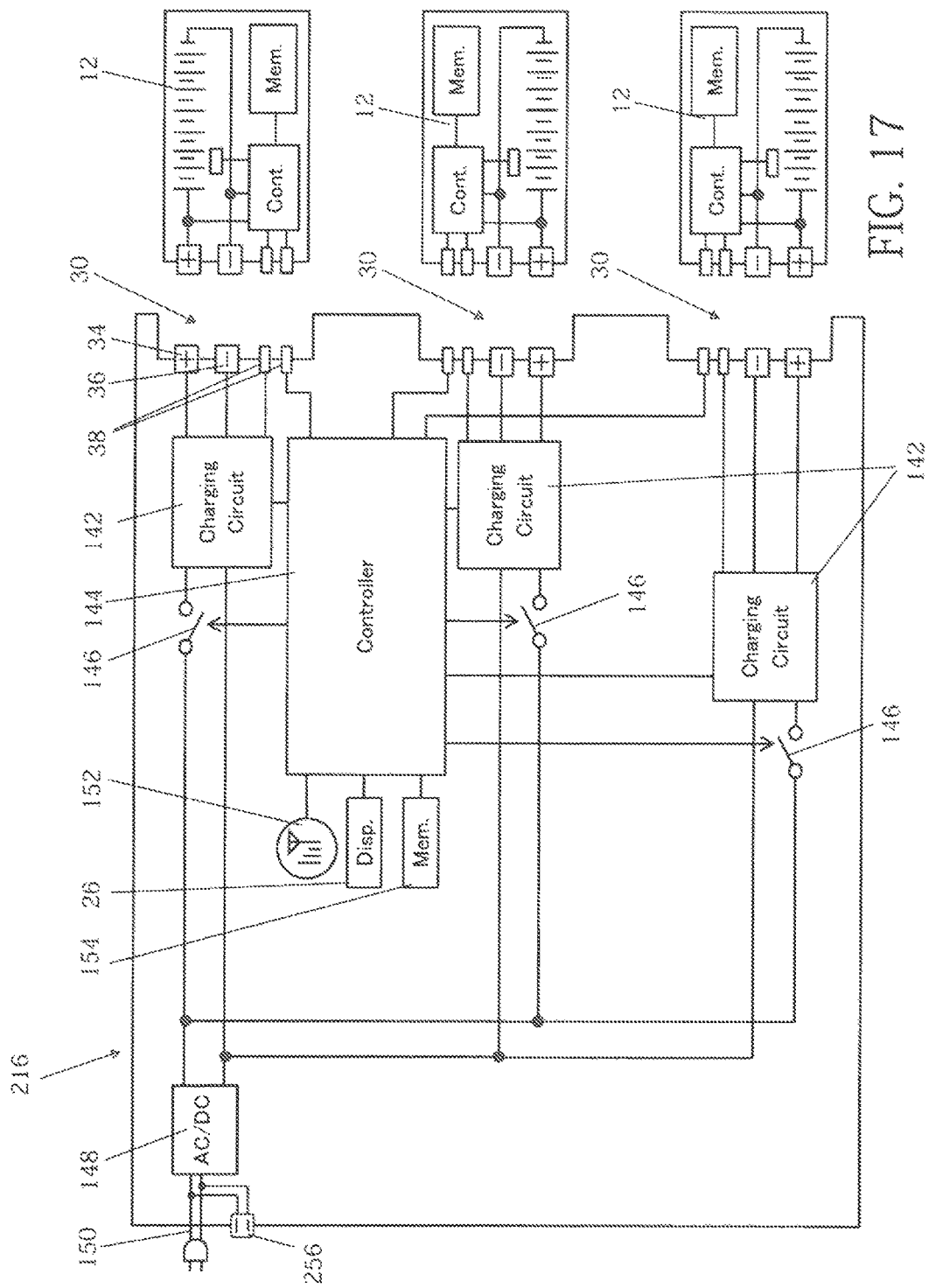
FIG. 17 shows a representative electric circuit diagram of the charger of the second embodiment.

A charger 216 of a second embodiment will now be explained with reference to FIG. 16A, FIG. 16B, and FIG. 17. The charger 216 of the second embodiment is a modified example of the charger 16 explained in the first embodiment and can use the battery system 10 of the first embodiment. Constituent elements (components) in common with the charger 16 of the first embodiment are assigned identical reference numbers and thus, a repetition of the detailed explanation of their construction and functions may be omitted. In principle, with minor modifications, the charger 216 could also be implemented, e.g., with the electric circuit configuration of either FIG. 14B or 14C, the description of which is incorporated into the present embodiment.

The charger 216 comprises a plurality of the battery interfaces 30, e.g., three in the present embodiment. Each of the battery interfaces 30 is configured such that one battery pack 12 can be attached thereto and detached therefrom. Each of the battery interfaces 30 comprises the positive charging output terminal 34, the negative charging output terminal 36, and the charging communication terminals 38, similar to the first embodiment. The charger 216 has the overall shape of a tray with wells or recesses, wherein one battery interface 30 is disposed on a surface (preferably a vertically extending surface) of each well or recess.

The charger 216 also comprises the AC/DC converter 148, a control circuit unit 218, and a plurality of the display parts (displays) 26. The plurality of charging circuits 142, the charger controller 144, the plurality of cutoff switches 146, the communication circuit 152, and the charger memory 154 are provided to the control circuit unit 218. The charger 216 has the same functions as the charger 16 of the first embodiment. Namely, the charger 216 is configured to be connectable with the external device 200 (refer to FIG. 15) so as to communicate therewith, and the battery information and/or the state information of the battery pack 12 can be transmitted together with the interface identification information of the battery interface 30 whereto that battery pack 12 is attached. In addition, the charger 216 can receive, from the external device 200, the charger update information, the operation instruction signal, and the battery update information. The transmission and reception of this information and signals is performed by the communication circuit 152 in the same manner as the first embodiment.

The charger 216 also comprises a power outlet 256. The power outlet 256 is connectable to the power cord 150 of an adjacent charger 216. When the power cord 150 is connected to the external AC power supply, the power outlet 256 can output the AC power supply to the adjacent charger 216. That is, as shown in FIG. 16B, the power outlet 256 is configured such that the power cord 150 of another charger 216 can be attached thereto and detached therefrom. Thereby, a plurality of the chargers 216 can be connected in series.

Third Embodiment

A charger 316 of a third embodiment will now be explained, with reference to FIGS. 18-20. The charger 316 of the third embodiment is a modified example of the charger 16 that was explained in the first and second embodiments and can use the battery system 10 of the first embodiment. Constituent elements in common with the charger 16 of the first embodiment are assigned identical reference numbers and thus need not be explained in detail below. Again, in principle, with minor modifications, the charger 316 could also be implemented, e.g., with the electric circuit configuration of either FIG. 14B or 14C, the description of which is incorporated into the present embodiment.

The charger 316 comprises a main unit 318 (i.e., a master unit) and one or more tray units 320 (i.e., a slave unit). The main unit 318 is configured such that one tray unit 320 can be attached thereto and detached therefrom. Referring to FIG. 19, the main unit 318 comprises a main unit positive terminal 334, a main unit negative terminal 336, and a main unit communication terminal 338. The (each) tray unit 320 comprises a tray unit positive terminal 344, a tray unit negative terminal 346, and a tray unit communication terminal 348. When the tray unit 320 is attached to the main unit 318, the tray unit positive terminal 344, the tray unit negative terminal 346, and the tray unit communication terminal 348 are electrically connected to the main unit positive terminal 334, the main unit negative terminal 336, and the main unit communication terminal 338, respectively. Thereby, the main unit 318 and the tray unit 320 are electrically connected.

Figure 18:
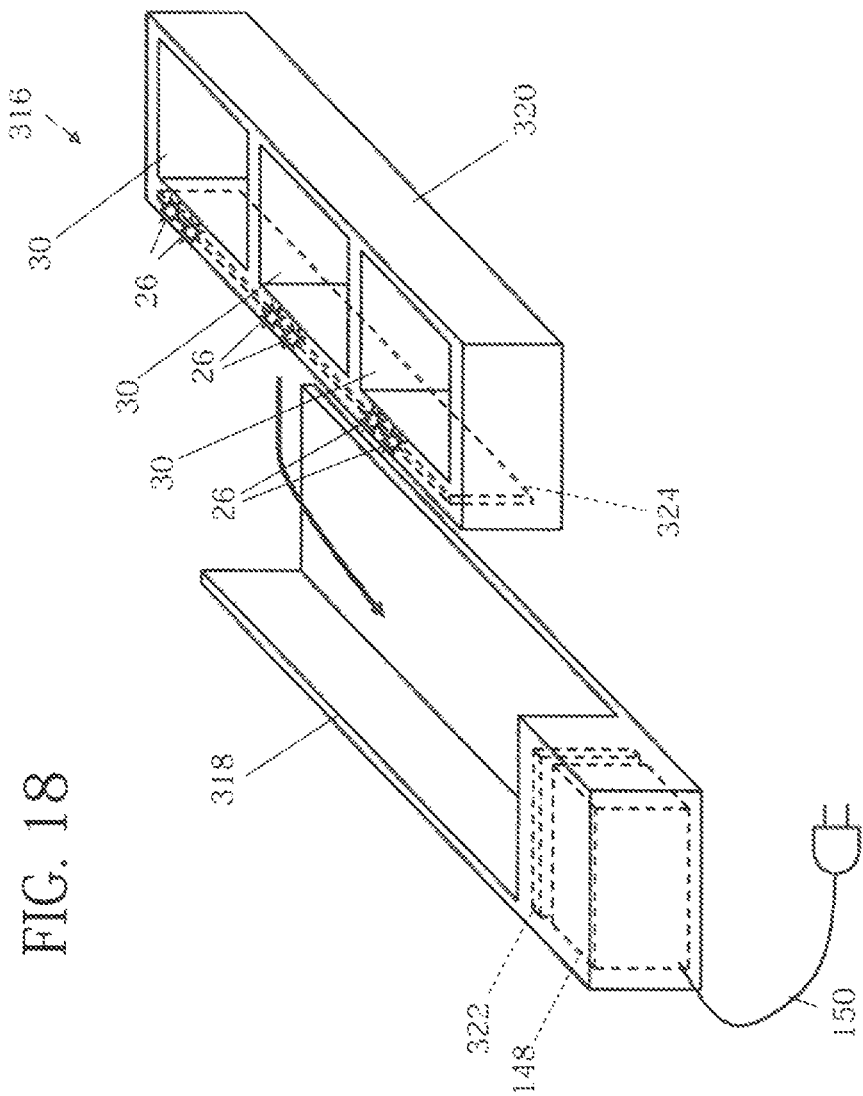
FIG. 18 shows the external appearance of a charger of a third embodiment.
Figure 19:
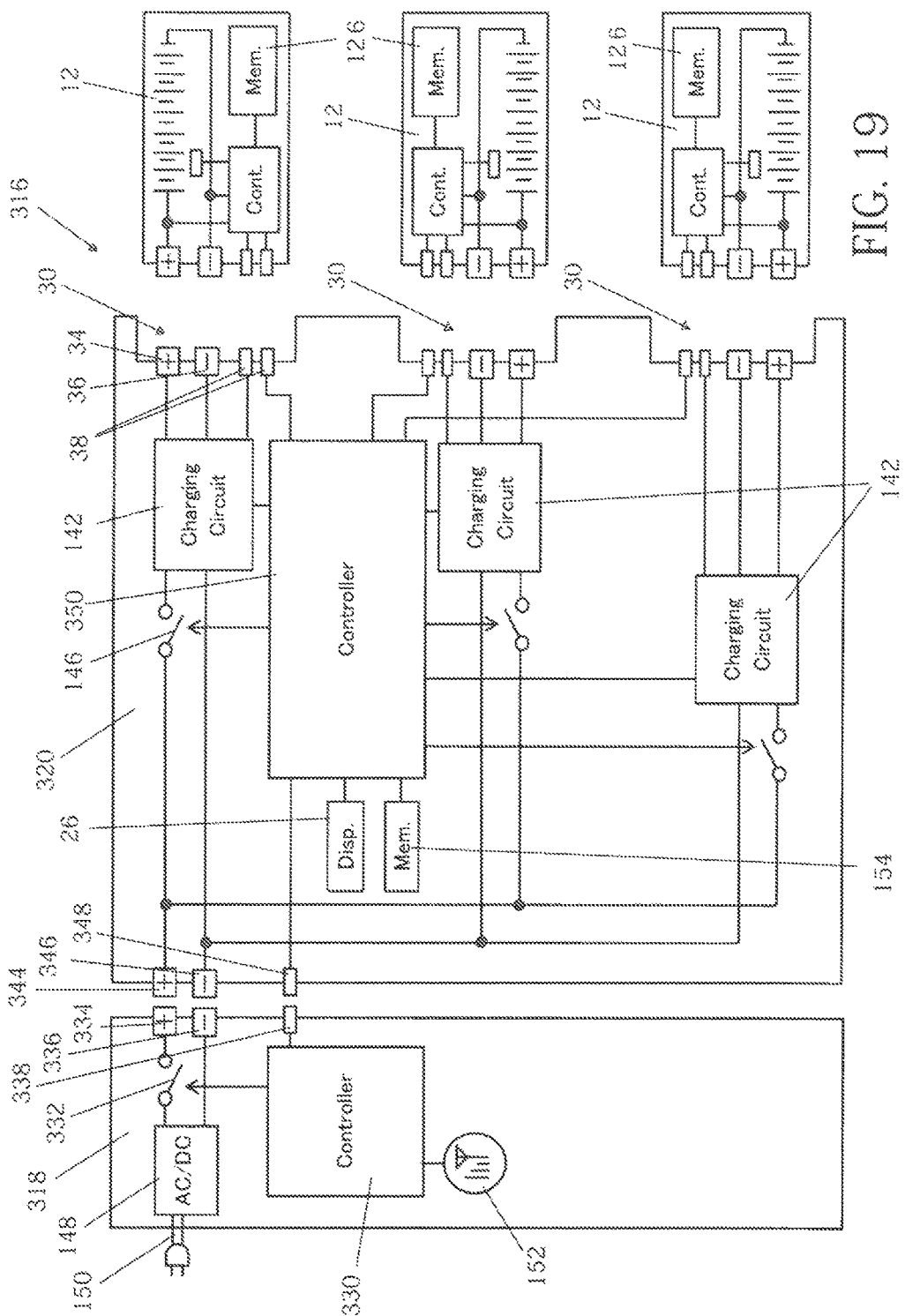
FIG. 19 shows a representative electric circuit diagram of the charger of the third embodiment.

Referring to FIG. 18, the main unit 318 comprises the AC/DC converter 148, a control circuit unit 322 (which includes a main unit controller 330 (i.e., a first charger controller), a cutoff switch 332 and the communication circuit 152 shown in FIG. 19) and the power supply cord 150. Referring again to FIG. 19, the main unit controller 330 is connected to the main unit communication terminal 338. The DC power, which is output by the AC/DC converter 148, is output from the main unit positive terminal 334 and the main unit negative terminal 336 and then supplied to the tray unit 320. Namely, the tray unit 320 receives the supply of electric current (power) from the main unit 318. The cutoff switch 332 is provided between the AC/DC converter 148 and the main unit positive terminal 334. The cutoff switch 332 is controlled by the main unit controller 330. When the tray unit 320 is attached to the main unit 318, the cutoff switch 332 is conductive; on the other hand, when the tray unit 320 is detached from the main unit 318, the cutoff switch 332 is non-conductive. In addition, the main unit controller 330 can connect to the external device 200 via the communication circuit 152 so as to communicate therewith.

As shown in FIG. 18, the tray unit 320 comprises a plurality of the battery interfaces 30. Each of the battery interfaces 30 is configured such that one battery pack 12 can be attached thereto and detached therefrom. Each of the battery interfaces 30 comprises the positive charging output terminal 34, the negative charging output terminal 36, and the charging communication terminals 38, similar to the first embodiment.

As shown in FIG. 19, the tray unit 320 comprises at least one control circuit unit 324 and a plurality of the display parts (displays) 26. A plurality of the charging circuits 142, a tray unit controller 350 (i.e., a second charger controller), a plurality of the cutoff switches 146, and the charger memory 154 are provided in the control circuit unit 324. The tray unit controller 350 is connected to the charging communication terminals 38 of each of the battery interfaces 30 and can communicate with the battery memory 126 of the battery pack 12 whereto the given battery interface 30 is attached. In addition, the tray unit controller 350 is connected to the tray unit communication terminal 348, and thereby is communicatively connected to the main unit controller 330. The combination of the main unit controller 330 and the tray unit controller 350 constitute a controller that corresponds to the charger controller 144 of the first embodiment.

In the charger 316 of the present embodiment, when the plurality of battery packs 12 is to be charged, the tray unit 320 is attached to the main unit 318. After charging is complete, the tray unit 320 can be detached from the main unit 318 with the plurality of battery packs 12 attached to the tray unit 320 as is. By using the tray unit(s) 320, the user can easily carry, organize, and store the plurality of battery packs 12. In this respect, the tray unit 320 of the present embodiment shares, in essence, at least some of the same functions as the battery holder 14 of the first embodiment.

The charger 316 of the present embodiment shares, in essence, at least some of the same functions as the charger 16 of the first embodiment. Namely, the charger 316 is connected to the external device 200 (refer to FIG. 15) so as to communicate therewith, and the battery information and/or state information of the given battery pack 12 can be transmitted together with the interface identification information of the battery interface 30 whereto that battery pack 12 is attached. In more detail, the tray unit controller 350 acquires the battery information and the state information from the battery memory 126 and acquires the corresponding interface identification information from the charger memory 154. The battery information and the state information are transmitted, together with the interface identification information, from the tray unit controller 350 to the main unit controller 330. The main unit controller 330 transmits the received battery information and state information, together with the received interface identification information, to the external device 200 via the charger communication circuit. In addition, the charger 316 can receive the charger update information, the operation instruction signal, and the battery update information from the external device 200. The reception of this information and signal is performed by the communication circuit 152. The received information and signal are transmitted from the main unit controller 330 to the tray unit controller 350 and, as needed, transmitted from the tray unit controller 350 to the corresponding battery pack 12.

Figure 20:
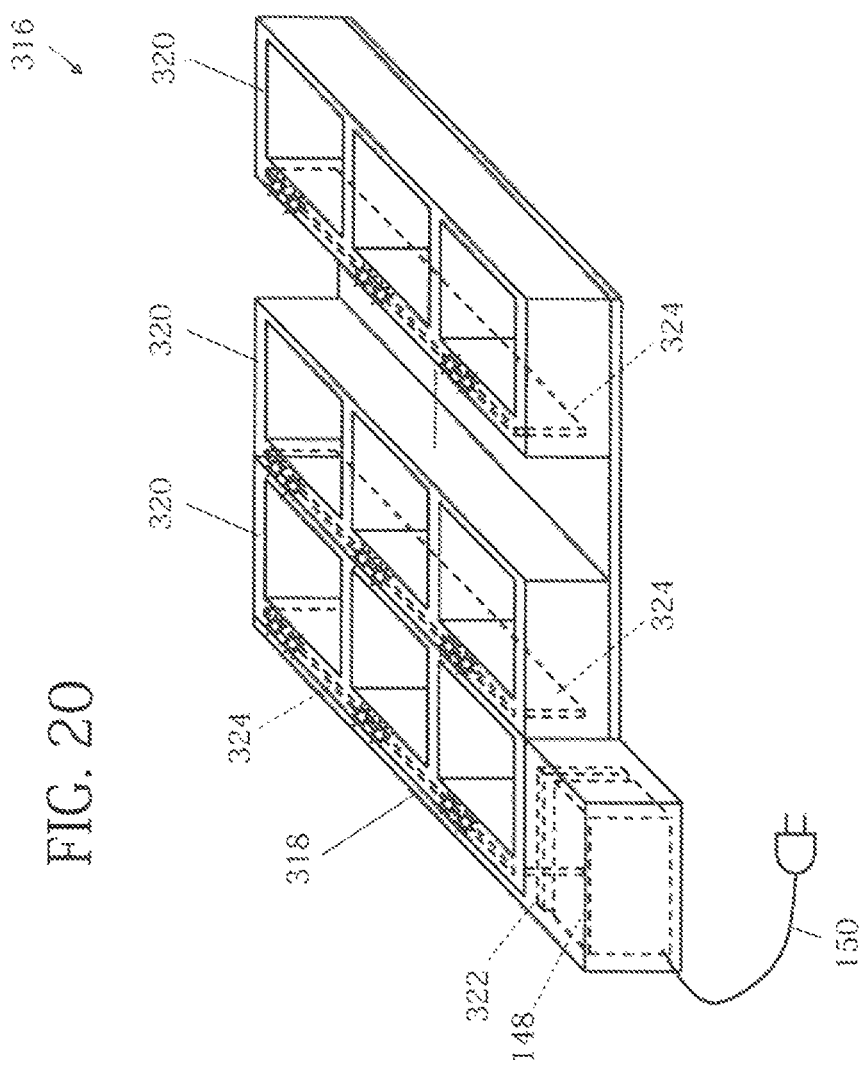
FIG. 20 is a modified example of the third embodiment and shows a charger, which comprises a plurality of tray units.

As shown in FIG. 20, the main unit 318 of the charger 316 can also be configured such that two or more tray units 320 can be attached thereto and detached therefrom. According to this configuration, the user can easily utilize an increased number of the tray units 320 as needed.

Fourth Embodiment

Figure 21:
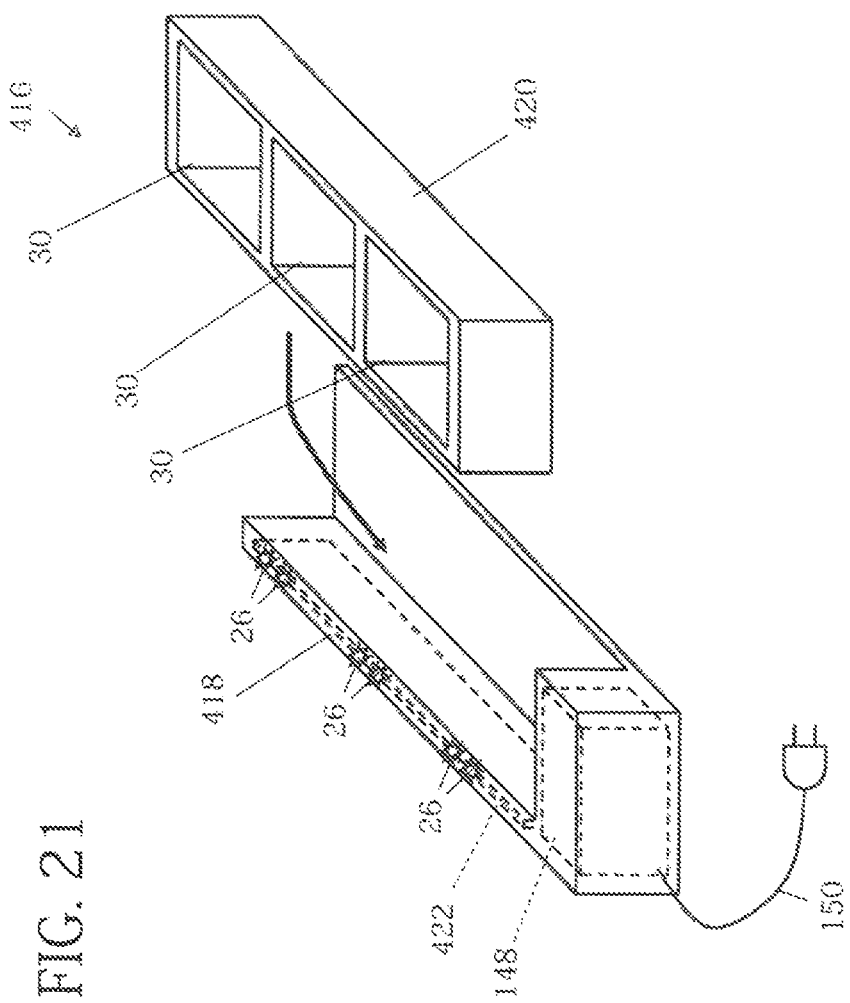
FIG. 21 shows the external appearance of a charger of a fourth embodiment.
Figure 22:
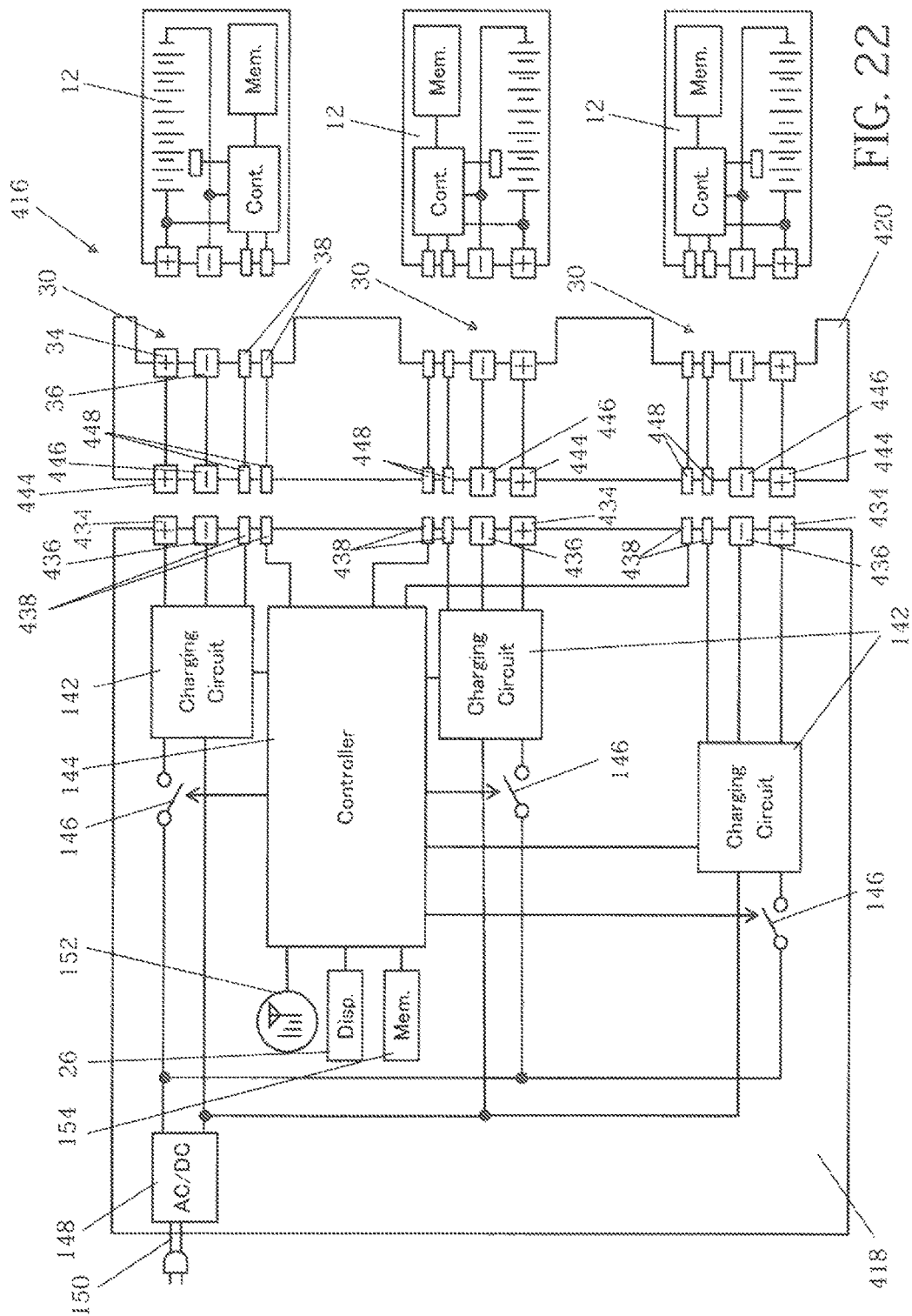
FIG. 22 shows a representative electric circuit diagram of the charger of the fourth embodiment.

A charger 416 of a fourth embodiment will now be explained with reference to FIGS. 21-23. The charger 416 of the fourth embodiment is a modified example of the charger 16 that was explained in the first, second and third embodiments and can use the battery system 10 of the first embodiment. The constituent elements in common with the charger 16 of the first embodiment are assigned identical reference numbers and need not be explained in detail below. Again, in principle, with minor modifications, the charger 416 could also be implemented, e.g., with the electric circuit configuration of either FIG. 14B or 14C, the description of which is incorporated into the present embodiment.

The charger 416 comprises a main unit 418 and a tray unit 420. The main unit 418 is configured such that the tray unit 420 can be attached thereto and detached therefrom. Referring to FIG. 22, the main unit 418 comprises a plurality of main unit positive terminals 434, a plurality of main unit negative terminals 436, and a plurality of main unit communication terminals 438. The tray unit 420 comprises a plurality of tray unit positive terminals 444, a plurality of tray unit negative terminals 446, and a plurality of tray unit communication terminals 448. When the tray unit 420 is attached to the main unit 418, the tray unit positive terminals 444, the tray unit negative terminals 446, and the tray unit communication terminals 448 are electrically connected to the main unit positive terminals 434, the main unit negative terminals 436, and the main unit communication terminals 438, respectively.

Referring again to FIG. 21, the main unit 418 comprises the AC/DC converter 148, a control circuit unit 422, and a plurality of the display parts (displays) 26. The plurality of charging circuits 142, the charger controller 144, the plurality of cutoff switches 146, the communication circuit 152, and the charger memory 154 are provided in the control circuit unit 422 as shown in FIG. 22. Each of the charging circuits 142 is connected to the corresponding main unit positive terminal 434, the corresponding main unit negative terminal 436, and the corresponding main unit communication terminal 438.

Similar to the third embodiment, the tray unit 420 also comprises a plurality of the battery interfaces 30. Each of the battery interfaces 30 is configured such that one battery pack 12 can be attached thereto and detached therefrom. Each of the battery interfaces 30 comprises the positive charging output terminal 34, the negative charging output terminal 36, and the charging communication terminals 38, as was described in the first embodiment. The positive charging output terminal 34, the negative charging output terminal 36, and the charging communication terminals 38 are connected to the corresponding tray unit positive terminal 444, the corresponding tray unit negative terminal 446, and the corresponding tray unit communication terminals 448, respectively.

In the charger 416 of the present embodiment, when the plurality of battery packs 12 is to be charged, the tray unit 420 is attached to the main unit 418. After charging is complete, the tray unit 420 can be detached from the main unit 418 with the plurality of battery packs 12 attached to the tray unit 420 as is. By using the tray unit 420, the user can easily carry, organize, and store the plurality of battery packs 12. The tray unit 420 of the present embodiment shares, in essence, at least some of the same functions as the battery holder 14 of the first embodiment.

The charger 416 of the present embodiment shares, in essence, at least some of the same functions as the charger 16 of the first embodiment. Namely, the charger 416 is connected to the external device 200 (refer to FIG. 15) so as to communicate therewith, and the battery information and/or the state information of the given battery pack 12 can be transmitted together with the interface identification information of the battery interface 30 whereto that battery pack 12 is attached. In addition, the charger 416 can receive the charger update information, the operation instruction signal, and the battery update information from the external device 200. The transmission and reception of this information and signal is performed by the communication circuit 152.

As shown in FIG. 23, the main unit 418 of the charger 416 can also be configured such that the plurality of tray units 420 can be attached thereto and detached therefrom. According to this configuration, the user can easily utilize an increased number of the tray units 420 as needed.

As will be readily appreciated, any of the controllers disclosed herein preferably comprises at least one microprocessor and/or digital or analog signal processing circuitry (e.g., a state machine). The microprocessor(s) is (are) programmable with software code execute the necessary functions of the device, in which it is disposed.

Furthermore, it is readily apparent that the battery holders 14 of the first embodiment may be advantageously utilized with the chargers 216, 316, 416 of the second, third and fourth embodiments, with only minimal modifications. That is, rather than providing partitions or walls that divide each charging unit 216, 320, 420 into two or more separate wells or compartments, each designed to hold one battery pack 12, the partitions could be omitted and the battery holders 14 could be inserted into the charging unit 216, 320, 420 so as to be interleaved between the battery pack(s) 12 and the charging unit 216, 320, 420. In the alternative, the battery holders 14 may be designed to be inserted into wells or recesses defined by partitions. In this case, the battery holders 14 may include one or more devices configured to physically engage at least one partition to retain the battery holder 14, and thus the battery pack(s) 12 attached thereto, during a charging operation.

In addition, although the battery interfaces 30 of the above-described representative embodiments are configured to electrically conduct charging current via wired connections, the battery interfaces 30 of any embodiment of the present teachings could instead be configured to wirelessly transmit power to the battery packs 12 via a varying electromagnetic fields, e.g., by electromagnetic induction. For example, power may be wirelessly transferred according to the Qi wireless charging standard, preferably according to a medium power specification. In this case, the battery interface 30 may comprise at least one induction coil for generating the varying the electromagnetic field and the battery packs 30 may also each comprise at least one induction coil for generating a current when disposed in the varying electromagnetic fields.

The display part or display 26 of any of the preceding embodiments may be, without limitation, an LCD or a display comprising one or more LEDs or OLEDs. In this case, the display 26 may be configured to display text to provide indications concerning the charging status. In addition or in the alternative, the display 26 may be comprised of one or more discrete illuminating devices, e.g., LEDs or incandescent lamps, of one or more colors (e.g., "green" for charging complete and "red" for charging incomplete).

Additional representative embodiments of the present teachings disclosed herein include, but are not limited to:

1. A battery system for a power tool, comprising:
a plurality of battery packs;
a battery holder, whereto the plurality of battery packs can be attached and wherefrom the plurality of battery packs can be detached; and
a charger, whereto the battery holder to which the plurality of battery packs is attached can be attached and wherefrom that battery holder can be detached;
wherein,
the battery holder is configured such that, when the battery holder is attached to the charger, the plurality of battery packs attached to the battery holder is electrically connected to the charger.

2. A battery system according to embodiment 1, wherein
the charger comprises a plurality of battery interfaces; and
each of the battery interfaces is configured such that it accepts the corresponding one battery pack.

3. A battery system according to embodiment 2, wherein
the battery interface comprises a charging output terminal, which outputs charging power to the battery pack.

4. A battery system according to embodiment 3, wherein
the charging output terminal is physically connected to the corresponding one battery pack.

5. A battery system according to any one of embodiment 2 through embodiment 4, wherein
the battery interface comprises a battery engaging part, which mechanically engages with the corresponding one battery pack.

6. A battery system according to embodiment 5, wherein
the battery engaging part comprises a slide rail, which slidably engages with the battery pack.

7. A battery system according to any one of embodiment 2 through embodiment 6, wherein
the battery interface is configured such that one of the battery packs can be directly attached thereto and detached therefrom even if the battery holder is absent.

8. A battery system according to any one of embodiment 1 through embodiment 7, wherein
each of the battery packs is configured such that it can be attached to and detached from the charger with the battery holder attached to the charger as is.

9. A battery system according to any one of embodiment 1 through embodiment 8, wherein
one element selected from the group consisting of the battery pack and the battery holder comprises a movable hook; and
the other element comprises a hook receiving part, which engages with the movable hook.

10. A battery system according to any one of embodiment 1 through embodiment 9, wherein
the battery holder comprises a handle.

11. A battery system according to any one of embodiment 1 through embodiment 10, wherein
the battery holder has a shape wherein the attached plurality of battery packs are isolated and do not contact ground.

12. A battery system according to any one of embodiment 1 through embodiment 11, wherein
the battery holder comprises a holder engaging part, which engages with another battery holder.

13. A battery system according to embodiment 12, wherein
the holder engaging part is capable of engaging with the other battery holder in the state wherein at least one of the battery packs is attached to the battery holder.

14. A battery system according to any one of embodiment 1 through embodiment 13, wherein
the battery holder is configured as a single member.

15. A battery holder for a battery system that comprises a plurality of power tool battery packs and a charger thereof, wherein
the battery holder is configured such that a plurality of battery packs can be attached thereto and detached therefrom and such that the battery holder can be attached to and detached from the charger, and such that, when the battery holder is attached to the charger, the plurality of battery packs attached to the battery holder are electrically connected to the charger.

16. The battery holder according to embodiment 15, further comprising a carrying handle.

17. The battery holder according to embodiment 15 or 16, further comprising:
a base part adapted to shield the plurality of battery packs attached thereto and prevent the battery packs from being contaminated by a surface, upon which the battery holder is rested.

18. The battery holder according to any one of embodiments 15-17, further comprising:
a battery holder engaging part adapted to mechanically engage the battery holder with another battery holder.

19. The battery holder according to embodiment 18, wherein the battery holder engaging part is adapted to mechanically engage the battery holder with another battery holder while at least one battery pack is attached to the battery holder.

20. The battery holder according to any one of embodiments 15-19, further comprising:
a hook receiving part adapted to detachably engage with a movable hook disposed on the battery packs.

21. A battery system for a power tool, comprising:
a plurality of battery packs; and
a charger for the plurality of battery packs;
wherein,
each of the battery packs comprises battery memory, which stores at least battery information; and
the charger comprises:
a plurality of battery interfaces, each battery interface being configured such that one of the battery packs can be attached thereto and detached therefrom;
a charger memory, which stores interface identification information assigned to each of the battery interfaces;
a charger controller, which communicates with the battery memory of each of the battery packs attached to each of the battery interfaces and acquires the battery information; and
a charger communication circuit, which is connected to the charger memories and the charger controller and transmits the battery information acquired from the battery memory of the given battery pack, together with the interface identification information of the battery interface whereto that battery pack is attached, to an external device.

22. A battery system according to embodiment 21, wherein the battery information is information that indicates at least one piece of information selected from the group consisting of the individual identification code of the battery pack, the model code of the battery pack, the rated voltage of the battery pack, the rated current of the battery pack, the permissible temperature of the battery pack, the maximum current experienced of the battery pack, the maximum temperature experienced of the battery pack, the usage start date of the battery pack, the total charges count of the battery pack, the total discharges count of the battery pack, the total discharge time of the battery pack, and the administrator of the battery pack.

23. A battery system according to embodiment 21 or embodiment 22, wherein the battery information is information that indicates at least one piece of information selected from the group consisting of the individual identification code of the battery pack, the model code of the battery pack, the rated voltage of the battery pack, the rated current of the battery pack, and the permissible temperature of the battery pack.

24. A battery system according to any one of embodiment 21 through embodiment 23, wherein the battery information is information that indicates at least the individual identification code of the battery pack.

25. A battery system according to any one of embodiment 21 through embodiment 24, wherein the charger communication circuit transmits, in addition to the battery information and the interface identification information, a state indication of each of the battery packs to the external device.

26. A battery system according to embodiment 25, wherein the state indication of the battery pack includes at least one piece of information selected from the group consisting of the charge level of the battery pack, the output voltage of the battery pack, the internal resistance of the battery pack, the temperature of the battery pack, and the charging elapsed time of the battery pack.

27. A battery system according to embodiment 25 or embodiment 26, wherein at least one element selected from the group consisting of the battery pack and the charger comprises a detector, which detects the state indication from each of the battery packs.

28. A battery system according to any one of embodiment 21 through embodiment 27, wherein the charger communication circuit is configured such that it is capable of receiving the information or signal transmitted from the external device.

29. A battery system according to embodiment 28, wherein the charger communication circuit is configured such that it receives charger update information, which changes the operation condition or the operating program stored in the charger.

30. A battery system according to embodiment 28 or embodiment 29, wherein the charger communication circuit is configured such that it receives an operation instruction signal intended for the charger.

31. A battery system according to embodiment 30, wherein the charger communication circuit is configured such that it further receives interface identification information of the battery interface that is the target of the operation instruction signal.

32. A battery system according to any one of embodiment 28 through embodiment 31, wherein the charger communication circuit is configured such that it receives battery update information, which changes the operation condition or the operating program stored in the battery pack.

33. A battery system according to embodiment 32, wherein the charger communication circuit is configured such that it further receives the interface identification information of the battery interface whereto is attached the battery pack to which the battery update information is to be applied.

34. A battery system according to embodiment 33, wherein the charger controller transmits the received battery update information to the battery pack that is attached to the battery interface corresponding to the received interface identification information.

35. A battery system according to any one of embodiment 21 through embodiment 34, wherein the charger communication circuit is configured such that it wirelessly communicates with the external device.

36. A battery system according to any one of embodiment 21 through embodiment 35, wherein the external device is a smart phone, a tablet computer, or some other portable information terminal.

37. A battery system according to any one of embodiment 21 through embodiment 36, wherein the charger comprises at least one master charger and at least one slave charger;

the plurality of battery interfaces comprises a plurality of first battery interfaces, which is provided to the master charger, and a plurality of second battery interfaces, which is provided to the slave charger;

the charger memory comprises a first charger memory, which is provided to the master charger, and a second charger memory, which is provided to the slave charger;

the first charger memory stores the interface identification information assigned to the first battery interface;

the second charger memory stores the interface identification information assigned to the second battery interface;

the charger controller comprises a first charger controller, which is provided to the master charger, and a second charger controller, which is provided to the slave charger; and the first charger controller and the second charger controller are configured such that they communicate with one another.

38. A battery system according to embodiment 37, wherein the first charger controller is configured such that differing interface identification information is assigned to each of the first battery interfaces and each of the second battery interfaces;

the first charger memory is configured such that it stores the interface identification information assigned to the first battery interface; and the second charger memory is configured such that it stores the interface identification information assigned to the second battery interface.

39. A battery system according to embodiment 37 or embodiment 38, wherein the slave charger is configured such that it is electrically connected to the master charger or another slave charger and such that it receives the supply of electric power from the master charger or the other slave charger.

40. A battery system according to any one of embodiment 37 through embodiment 39, wherein the slave charger is configured such that it is mechanically connected to the master charger or another slave charger.

41. A battery system according to any one of embodiment 21 through embodiment 36, wherein the charger comprises at least one master circuit board and at least one slave circuit board;

the plurality of battery interfaces comprises at least one first battery interface, which is electrically connected to the master circuit board, and at least one second battery interface, which is connected to the slave circuit board;

the charger memory comprises a first charger memory, which is provided to the master circuit board, and a second charger memory, which is provided to the slave circuit board;

the first charger memory stores the interface identification information assigned to the first battery interface;

the second charger memory stores the interface identification information assigned to the second battery interface;

the charger controller comprises a first charger controller, which is provided to the master circuit board, and a second charger controller, which is provided to the slave circuit board; and the first charger controller and the second charger controller are configured such that they communicate with one another.

42. A battery system according to any one of embodiment 21 through embodiment 36, wherein the charger comprises one common circuit board;

the common circuit board comprises at least one master circuit block and at least one slave circuit block;

the plurality of battery interfaces comprises at least one first battery interface, which is electrically connected to the master circuit block, and at least one second battery interface, which is connected to the slave circuit block;

the charger memory comprises a first charger memory, which is included in the master circuit block, and a second charger memory, which is included in the slave circuit block;

the first charger memory stores the interface identification information assigned to the first battery interface;

the second charger memory stores the interface identification information assigned to the second battery interface;

the charger controller comprises a first charger controller, which is included in the master circuit block, and a second charger controller, which is included in the slave circuit block; and the first charger controller and the second charger controller are configured such that they communicate with one another.

43. A battery system according to embodiment 41 or embodiment 42, wherein the first charger controller is configured such that differing interface identification information is assigned to each of the first battery interfaces and each of the second battery interfaces;

the first charger memory is configured such that it stores the interface identification information assigned to the first battery interface; and the second charger memory is configured such that it stores the interface identification information assigned to the second battery interface.

44. A battery system according to any one of embodiment 21 through embodiment 36, wherein the charger comprises at least one master unit and at least one slave unit;

the plurality of battery interfaces is provided to the at least one slave unit;

the charger communication circuit is provided to the at least one master unit;

the charger controller comprises a first charger controller, which is provided to the master unit, and a second charger controller, which is provided to the slave unit, and is configured such that the first charger controller and the second charger controller communicate with one another;

the first charger controller is connected to the charger communication circuit and is configured such that it communicates with an external device via the charger communication circuit; and the second charger controller is connected to the plurality of battery interfaces and is configured such that it communicates with the battery memory of the battery pack that is attached to the given battery interface.

45. A battery system according to embodiment 44, wherein the second charger controller is configured such that it acquires the battery information from the battery memory and transmits the acquired battery information to the first charger controller; and the first charger controller is configured such that it transmits the battery information received from the second charger controller to the external device via the charger communication circuit.

46. A battery system according to embodiment 44 or embodiment 45, wherein the charger memory is provided to the at least one slave unit.

47. A battery system according to embodiment 46, wherein the second charger controller is configured such that it acquires the interface identification information from the charger memory and transmits the acquired interface identification information to the first charger controller; and the first charger controller is configured such that it transmits the interface identification information received from the second charger controller to the external device via the charger communication circuit.

48. A charger for a plurality of power tool battery packs, comprising:

a plurality of battery interfaces, each of the battery interfaces being configured such that one battery pack can be attached thereto and detached therefrom;

a charger memory, which stores interface identification information assigned to each of the battery interfaces;

a charger controller, which communicates with a battery memory of the battery pack attached to each of the battery interfaces and acquires the battery information stored in the battery memory; and a charger communication circuit that is connected to the charger memory and a charger controller reader and transmits to an external device the battery information acquired from each of the battery packs and the interface identification information of the battery interface whereto that battery pack is attached.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved battery systems, battery holders and chargers, as well as methods for manufacturing and using the same.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

REFERENCE SIGNS LIST

10: battery system
12: battery pack
14: battery holder
16, 216, 316, 416: charger
17: common circuit board
18: master charger
18': master circuit board
18": master circuit block
20: slave charger
20': slave circuit board
20": slave circuit blocks
22: base part
22a: front end part
22b: rear end part
23a: coupling recessed part
23b: coupling protruding part
24: wall part
26: display part (display)
28: engaging groove
30: battery interface
32: slide rail
34: positive charging output terminal
36: negative charging output terminal
38: charging communication terminals
42: positive output terminal
44: negative output terminal
46: communication connection terminal
52: positive input terminal
54: negative input terminal
56: communication connection terminal
60: base part
64: wall part
66: handle
68: recessed part
70: battery holding part
72: engaging latch
74: hook receiving part
76: lower support part
78: opening
82: engaging projection
84: engaging groove
86: engaging projection
88: engaging groove
90: engaging groove
91: connecting part
92: movable hook
94: battery positive terminal
96: battery negative terminal
98: battery communication terminals
120: battery cell
122: battery controller
124: temperature sensor
126: battery memory
142: charging circuit
144: charger controller
146: cutoff switch
148: AC/DC converter
150: power cord
152: communication circuit
154: charger memory
200: external device
202: display
204: interface identification information
206: individual identification code
218: control circuit unit
256: power outlet
318, 418: main unit
320, 420: tray unit
322, 422: control circuit unit
324: control circuit unit
330: main unit controller
332: cutoff switch
334, 434: main unit positive terminal
336, 436: main unit negative terminal
338, 438: main unit communication terminal
344, 444: tray unit positive terminal
346, 446: tray unit negative terminal
348, 448: tray unit communication terminal
350: tray unit controller

The invention claimed is:

1. A power tool charger that charges a battery pack of a power tool comprising:
a charging unit that supplies direct current power to at least one battery cell of the battery pack for charging a rechargeable battery of a power tool;
a condition detection unit that measures the voltage of the battery pack to detect condition information of the battery pack; and
an information processing unit that receives the condition information of the battery pack from the condition detection unit and outputs the received condition information of the battery pack to a communication unit that is configured to perform wireless communication with another device in accordance with a near field communication standard,
further comprising a charger body that accommodates the charging unit, the condition detection unit, and the information processing unit,
the charger body includes:
a plurality of terminals of the charger body that are respectively connectable to a plurality of electrodes of the battery pack,
wherein the condition information includes information specifying that the charging of the battery pack is completed to, and
when determining that the state of charge of the battery pack is the predetermined value, the information processing unit has the charging unit terminate charging of the rechargeable battery and outputs the information specifying that the charging of the battery pack is completed to the communication unit.

2. The power tool charger according to claim 1, wherein:
the condition detection unit detects the condition information of the rechargeable battery regardless of whether or not the charging unit is charging the rechargeable battery, and
the information processing unit outputs the condition information of the rechargeable battery detected by the condition detection unit to the communication unit.

3. The power tool charger according to claim 1, wherein when receiving a charging termination signal from another device via the communication unit, the information processing unit has the charging unit terminate charging of the rechargeable battery.

4. A power tool charging system comprising:
a battery pack of a power tool;
a power tool charger that charges a battery pack of a power tool, wherein the power tool charger includes:
a charging unit that supplies direct current power to at least one battery cell of the battery pack for charging a rechargeable battery of a power tool,
a condition detection unit that measures the voltage of the battery pack to detect condition information of the battery pack when the battery is being charged, and
an information processing unit that receives the condition information of the battery pack from the condition detection unit; and
a communication unit that is configured to perform wireless communication with another device in accordance with a near field communication standard when the battery is being charged,
wherein the information processing unit outputs the received condition information of the battery pack to the communication unit,
the power tool charger further including a charger body that accommodates the charging unit, the condition detection unit, and the information processing unit,
the charger body includes:
a plurality of terminals of the charger body that are respectively connectable to a plurality of electrodes of the battery pack,
wherein the condition information includes information specifying that the charging of the battery pack is completed, and
when determining that the state of charge of the battery pack is the predetermined value, the information processing unit has the charging unit terminate charging of the rechargeable battery and outputs the information specifying that the charging of the battery pack is completed to the communication unit.

5. A charger configured to charge a battery pack for a power tool, the charger comprising:
at least one battery interface configured to detachably attach to the battery pack;
a charging circuit configured to charge the battery pack attached to the battery interface; and
a charger controller configured to acquire information related to the battery pack attached to the battery interface,
wherein the charger controller is connectable to a wireless communication circuit and is configured to transmit the acquired information to an external device via the wireless communication circuit, and the acquired information includes battery information of the battery pack, the battery information including a unique identification code of the battery pack,
further comprising a charger housing on which the battery interface is disposed, wherein the charger housing is configured to accommodate the wireless communication circuit inside the charger housing.

6. The charger according to claim 5, wherein the charger controller is configured to receive charger update information from the external device via the wireless communication circuit and to change an operation condition, an operating parameter and/or an operating program stored in a memory of the charger based upon the received charger update information.

7. The charger according to claim 5, wherein the charger controller is configured to receive an operation instruction signal from the external device via the wireless communication circuit and to perform an operation corresponding to the received operation instruction signal.

8. The charger according to claim 7, wherein the charger controller is configured to further receive interface identification information assigned to the battery interface attached to the battery pack, together with the operation instruction signal from the external device, via the wireless communication circuit.

9. A charging system configured to charge a battery pack for a power tool, the system comprising:
a charger comprising:
a charger housing;
at least one battery interface on an exterior of the charger housing, the battery interface being configured to detachably engage the battery pack,
a charging circuit inside the charger housing, the charging circuit being configured to charge the battery pack attached to the battery interface, and
a charger controller inside the charger housing configured to acquire information related to the battery pack attached to the battery interface;
a housing containing a wireless communication circuit;
the wireless communication circuit being located outside the charger housing and being connected to the charger controller,
wherein the charger controller is configured to transmit the acquired information to an external device via the wireless communication circuit, and
wherein the charger housing is configured to detachably engage the housing containing the wireless communication circuit such that the housing containing the wireless communication circuit is fixed at a prescribed position relative to the charger housing.

10. The charging system according to claim 9, further comprising an external device configured to receive the information transmitted from the wireless communication circuit and display the received information.

11. The charging system according to claim 10, wherein:
the charger controller is configured to further transmit interface identification information assigned to the battery interface attached to the battery pack, together with the acquired information, to the external device via the wirelessly communication circuit, and
the external device is configured to further receive the interface identification information transmitted from the wireless communication circuit and display the information related to the battery pack together with the interface identification information.

12. The power tool charger according to claim 1, wherein the battery pack remains external to the charger when the battery pack is connected to the charger.

13. The power tool charger according to claim 1, wherein the plurality of terminals of the charger body is at least partially arranged on an outer surface of the charger body.

14. The power tool charging system according to claim 4, wherein, when receiving a charging termination signal from another device via the communication unit, the information processing unit has the charging unit terminate charging of the rechargeable battery.

15. The power tool charging system according to claim 4, wherein the battery pack remains external to the charger when the battery pack is connected to the charger.

16. The power tool charging system according to claim 15,
wherein the plurality of terminals of the charger body is at least partially arranged on an outer surface of the charger body.

17. The charger according to claim 5,
wherein the battery interface is disposed on an external surface of the charger housing and the charger controller and the wireless communication circuit are located in an interior of the charger housing.

18. The charging system according to claim 9,
wherein the charger housing includes a communication connection terminal, and
wherein the charger housing and the housing containing the wireless communication circuit are configured such that fixing the housing containing the wireless communication circuit to the charger housing electrically connects the wireless communication circuit to the communication connection terminal.

19. The charging system according to claim 18, including at least one battery interface configured to detachably engage the battery pack on the exterior of the housing containing the wireless communication circuit.

20. The charging system according to claim 9, including at least one battery interface configured to detachably engage the battery pack on the exterior of the housing containing the wireless communication circuit.

21. A power tool charger that charges a battery pack of a power tool comprising:
a charging unit that supplies direct current power to at least one battery cell of the battery pack for charging a rechargeable battery of a power tool;
a condition detection unit that measures the voltage of the battery pack to detect condition information of the battery pack; and
an information processing unit that receives the condition information of the battery pack from the condition detection unit and outputs the received condition information of the battery pack to a communication unit that is configured to perform wireless communication with another device in accordance with a near field communication standard,
further comprising a charger body that accommodates the charging unit, the condition detection unit, and the information processing unit,
the charger body includes:
a plurality of terminals of the charger body that are respectively connectable to a plurality of electrodes of the battery pack,
wherein the condition information includes information specifying that the charging of the battery pack is completed to a predetermined value, and
when charging of the battery pack is completed to the predetermined value, the information processing unit has the charging unit terminate charging of the rechargeable battery and outputs the information specifying that the charging of the battery pack is completed to the predetermined value to the communication unit.

* * * * *